(12) United States Patent
Yokoo et al.

(10) Patent No.: US 6,449,518 B1
(45) Date of Patent: Sep. 10, 2002

(54) STORAGE MEDIUM, ROBOT, INFORMATION PROCESSING DEVICE AND ELECTRONIC PET SYSTEM

(75) Inventors: Naohiro Yokoo, Kanagawa; Yasuhiko Kato, Tokyo; Masakazu Hattori, Kanagawa; Masahiro Fujita, Saitama; Hiroaki Kitano, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/135,830

(22) Filed: Aug. 18, 1998

(30) Foreign Application Priority Data

Aug. 22, 1997 (JP) ............................................. 9-226055
Feb. 13, 1998 (JP) ........................................... 10-030793

(51) Int. Cl.[7] ............................................. G05B 19/42
(52) U.S. Cl. .............................. 700/86; 700/1; 700/11; 700/17
(58) Field of Search ................. 700/86, 1, 11, 700/17

(56) References Cited

U.S. PATENT DOCUMENTS

| | | | |
|---|---|---|---|
| 5,393,070 A | 2/1995 | Best | 273/434 |
| 5,586,257 A | 12/1996 | Perlman | 463/42 |
| 5,659,691 A | 8/1997 | Durward et al. | 395/329 |
| 5,727,950 A | 3/1998 | Cook et al. | 434/350 |
| 5,754,740 A | 5/1998 | Fukuoka et al. | 395/68 |
| 5,761,644 A | 6/1998 | Ueda et al. | 705/1 |
| 5,802,296 A | 9/1998 | Morse et al. | 395/200.38 |
| 5,812,126 A | 9/1998 | Richardson et al. | 345/330 |
| 5,850,352 A | 12/1998 | Moezzi et al. | 364/514 A |
| 5,880,731 A | 3/1999 | Liles et al. | 345/349 |
| 5,926,179 A | 7/1999 | Matsuda et al. | 345/355 |
| 5,941,770 A | 8/1999 | Miers et al. | 463/13 |
| 5,956,028 A | 9/1999 | Matsui et al. | 345/329 |
| 5,956,485 A | 9/1999 | Perlman | 395/200.34 |
| 5,966,129 A | 10/1999 | Matsukuma et al. | 345/418 |
| 5,966,526 A | 10/1999 | Yokoi | 395/500.32 |
| 5,971,855 A | 10/1999 | Ng | 463/42 |
| 5,982,372 A | 11/1999 | Brush, II et al. | 345/418 |
| 5,983,003 A | 11/1999 | Lection et al. | 395/200.32 |
| 6,009,460 A | 12/1999 | Ohno et al. | 709/204 |

FOREIGN PATENT DOCUMENTS

| | | | |
|---|---|---|---|
| JP | 7-160853 | 6/1995 | G06F/15/62 |
| JP | 9-81781 | 3/1997 | G06F/15/62 |

OTHER PUBLICATIONS

M. Pesce, "VRML Browsing & Building Cyberspace," New Riders Publishing 1995, pp. 43–81.

Nikkei Electronics, No. 686, Apr. 7, 1997, pp. 131–134.

Nikkei Electronics, No. 670, Sep. 9, 1996, pp. 151–159.

S. Chen et al., "The Out of Box Experience: Lessons Learned Creating Compelling VRML 2.0 Content," Proceedings of the Second Symposium on Virtual Reality Modeling Language, Feb. 1997, pp. 83–92.

(List continued on next page.)

Primary Examiner—Ayaz Sheikh
Assistant Examiner—Frantz B. Jean
(74) Attorney, Agent, or Firm—Bell, Boyd & Lloyd LLC

(57) ABSTRACT

An electronic pet having reality by various machines is implemented. An IC card stores a matter to be renewed in accordance with an action when an electronic pet takes the action on the basis of an internal status parameter which contains the feeling of the electronic pet and represents the internal status thereof, and it is detachably mounted in a device functioning as the body of the electronic pet. A virtual pet device functions as the body of the electronic pet and performs processing to display the electronic pet, and it has a slot in which the IC card is detachably mounted. A pet type robot functions as the body of the electronic pet, and it has a slot in which the IC card is detachably mounted.

56 Claims, 19 Drawing Sheets

OTHER PUBLICATIONS

B. Damer et al., Peopled Online Virtual Worlds: A New Home for Cooperating Communities, a New Frontier for Interaction Design (Panel), Proceedings of the ACM Conference on Computer Supporter Cooperative Work, Nov. 1996, pp. 441–442.

S. Harrison et al., "Re–Placeing Space: The Roles of Place and Space in Collaborative Systems," Proceedings of the ACM Conference on Computer Supporter Cooperative Work, Nov. 1996, pp. 67–76.

R. Lea et al., "Community Place: Architecture and Performance," Proceedings of the Second Symposium on Virtual Reality Modeling Language, Feb. 1996, pp. 41–50.

B. Damer, Inhabited Virtual Worlds: A New Frontier for Interaction Design, Interactions, vol. 3, Issue 5, Sep./Oct. 1996, pp. 27–34.

W. Broll., "Populating the Internet: Supporting Multiple Users and Shared Applications with VRML," Proceedings of the Second Symposium on Virtual Reality Modeling Language, Feb. 1997, pp. 33–40.

D. Kurlander et al., "Comic Chat," Proceedings of the 23rd Annual Conference on Computer Graphics, Aug. 1996, pp. 225–236.

Ultima III Manual and Selected Pages from Ultima I–VIII, Collection Manual.

K. Perlin et al., "Improv: A System for Scripting Interactive Actors in Virtual Worlds," Proceedings of the 23rd Annual Conference on Computer Graphics, Aug. 1996, pp. 205–216.

FIG.5

| ITEM | PARAMETER |
|---|---|
| ANGER | 0 |
| PLEASURE | 0 |
| SURPRISE | 0 |
| FEAR | 0 |
| SADNESS | 0 |
| STARVATION | 0 |
| EVACUATION | 0 |
| OBEDIENCE | 0 |
| FATIGUE | 0 |
| THIRST | 0 |
| SLEEPINESS | 0 |
| FOOD | 0 |
| DRINK | 0 |
| TRICK | 0 |
| GROWTH | 0 |

ANGER–SADNESS: FEELING
STARVATION–GROWTH: STATUS
All items: INTERNAL STATUS

FIG.6

| | EXTERNAL INPUT | | | | TIME INPUT | INTERNAL INPUT | | | |
|---|---|---|---|---|---|---|---|---|---|
| | SCOLD | PRAISE | FEED | ... | CALL NAME | TIME | BARK | RUN | ... | SLEEP |
| ANGER | ... | -200000 | ... | ... | ... | -1000 | -10000 | ... | ... | ... |
| PLEASURE | ... | 650000 | ... | ... | ... | -200 | 5 | ... | ... | ... |
| SURPRISE | ... | 10000 | ... | ... | ... | -600 | -200000 | ... | ... | ... |
| FEAR | ... | -100000 | ... | ... | ... | -200 | -20000 | ... | ... | ... |
| SADNESS | ... | -200000 | ... | ... | ... | -400 | -2 | ... | ... | ... |
| STARVATION | ... | 0 | ... | ... | ... | 0 | 10 | ... | ... | ... |
| EVACUATION | ... | 0 | ... | ... | ... | 0 | 3 | ... | ... | ... |
| OBEDIENCE | ... | 60000 | ... | ... | ... | -2 | 1000 | ... | ... | ... |
| FATIGUE | ... | 0 | ... | ... | ... | 1 | 1000 | ... | ... | ... |
| THIRST | ... | 0 | ... | ... | ... | 1 | 4 | ... | ... | ... |
| SLEEPINESS | ... | 0 | ... | ... | ... | 0 | 2 | ... | ... | ... |
| FOOD | ... | 0 | ... | ... | ... | 0 | 0 | ... | ... | ... |
| DRINK | ... | 0 | ... | ... | ... | 0 | 0 | ... | ... | ... |
| TRICK | ... | | ... | ... | ... | | | ... | ... | ... |
| GROWTH | ... | 0 | ... | ... | ... | 0 | 0 | ... | ... | ... |

FEELING / STATUS — INTERNAL STATUS

ACTION IGNITION CONDITION

FIG.14

| | ITEM | PARAMETER |
|---|---|---|
| FEELING | ANGER | 0 |
| | PLEASURE | 0 |
| | SURPRISE | 0 |
| | FEAR | 0 |
| | SADNESS | 0 |
| STATUS | STARVATION | 0 |
| | EVACUATION | 0 |
| | OBEDIENCE | 0 |
| | FATIGUE | 0 |
| | THIRST | 0 |
| | SLEEPINESS | 0 |
| | FOOD | 0 |
| | DRINK | 0 |
| | TRICK: GIVE ME YOUR FOOT | 0 |
| | TRICK: SIT | 0 |
| | ⋮ | ⋮ |
| | GROWTH | 0 |

(INTERNAL STATUS spans FEELING and STATUS)

STORAGE MEDIUM, ROBOT, INFORMATION PROCESSING DEVICE AND ELECTRONIC PET SYSTEM

BACKGROUND OF THE INVENTION

1. Field of the Invention

The present invention relates to a storage medium, a robot, an information processing device and an electronic pet system, and particularly to a storage medium which can implement an electronic pets by each of various devices, a robot, an information processing device and an electronic pet system.

2. Description of the Related Art

Recently, a so-called electronic pet machine (or, a bring-up simulation game machine) has been in fashion because it is easier than to bring up an actual animal as a pet, etc.

In an electronic pet machine, a living-body object which is an object of a living body serving as a pet is displayed as an electronic pet, and the status of the electronic pet such as starvation (hunger), the degree of fatigue, etc. is notified with a picture or voice to a pet owner (user of the electronic pet machine). The pet owner operates the electronic pet machine in accordance with the status of the electronic pet to feed the pet or play with the pet. On the basis of the pet owner's action, the status of the electronic pet is varied, and brought up. The electronic pet grows up with time lapse, and the status thereof is also varied.

In the electronic pet machine, an electronic pet is merely displayed, and thus it is a so-called virtual being.

On the other hand, when an electronic pet is implemented, for example, by a robot as an actual being, it enables a user to feel more closely as if he actually brings up a pet than the electronic pet machine because a robot as an electronic pet exists.

However, in the case where the electronic pet is implemented by the robot, it is inconvenient to carry it in a travel, for example. Accordingly, if it can be realized that an electronic pet is implemented by a robot serving as an actual being in some cases while it is implemented by a virtual being in a portable electronic pet machine in the other cases, this would be convenient.

Further, an electronic pet which is implemented by a conventional electronic pet device or the like generally changes its status in accordance with an input from a user or time lapse, and takes an action, so that it lacks reality.

That is, for example, a dog which is an actual pet may attract master's attention by barking or wagging its tail when the dog wants to play with its master. In this case, if the master neglects the dog, the pet is tired and stops barking or wagging its tail, for example, takes an action such as sleeping. The pet may be restored to good humor by sleeping.

On the other hand, according to the conventional electronic pet device, for example when he wants to play with its master, the dog merely continues to take such an action as barking or wagging its tail, or stops taking such an action because of the time lapse, so that there is no case where the dog sleeps because it is tired with barking or wagging its tail. That is, in the prior art, the status of the electronic pet is not varied in accordance with such an action as barking or wagging its tail which is taken by the electronic pet itself, and thus there is no case where the electronic pet takes no conduction (action) in accordance with the variation of the status due to the action taken by itself.

SUMMARY OF THE INVENTION

The present invention has been implemented in view of the foregoing situation, and it aims to implement an electronic pet by each of various devices with higher reality.

A storage medium according to the present invention is characterized in that the storage medium stores a matter to be renewed in accordance with an action when a living-body object which is an object of a living body takes the action on the basis of an internal status parameter which contains the feeling of the living-body object and represents the internal status of the living-body object, and it is detachably mounted in a body machine serving as the body of the living-body object. Accordingly, it is possible to mount the storage medium to various body machines, thereby making the body machines function as living-body objects.

A robot according to the present invention is characterized in that in the robot is detachably mounted a storage medium which stores a matter to be renewed in accordance with an action when a living-body object takes the action on the basis of an internal status parameter which contains the feeling of the living-body object and represents the internal status of the living-body object. Accordingly, the living-body object which takes an action in accordance with the storage medium can be implemented by the robot.

An information processing device according to the present invention is characterized in that in the information processing device is detachably mounted a storage medium which stores a matter to be renewed in accordance with an action when a living-body object takes the action on the basis of an internal status parameter which contains the feeling of the living-body object and represents the internal status of the living-body object. Accordingly, the living-body object which takes an action in accordance with the storage medium can be implemented by the information processing device.

An electronic pet system according to the present invention is characterized by including: a storage medium which stores a matter to be renewed in accordance with an action when an electronic pet takes the action on the basis of an internal status parameter which represents the internal status thereof and contains the feeling of the electronic pet, and is detachably mounted in a device functioning as the body of the electronic pet; a robot which functions as the body of the electronic pet and in which the storage medium is detachably mounted; and an information processing device which functions as the body of the electronic pet and performs processing to display the electronic pet and in which the storage medium is detachably mounted.

BRIEF DESCRIPTION OF THE DRAWINGS

FIG. 5 is a diagram showing the details of the internal status in the gene data of FIG. 4;

FIG. 6 is a diagram showing the details of feedback data in the gene data of FIG. 4;

FIG. 14 is a diagram showing the details of the internal status in the gene data of FIG. 4;

DETAILED DESCRIPTION OF THE PREFERRED EMBODIMENTS

Figure 1:
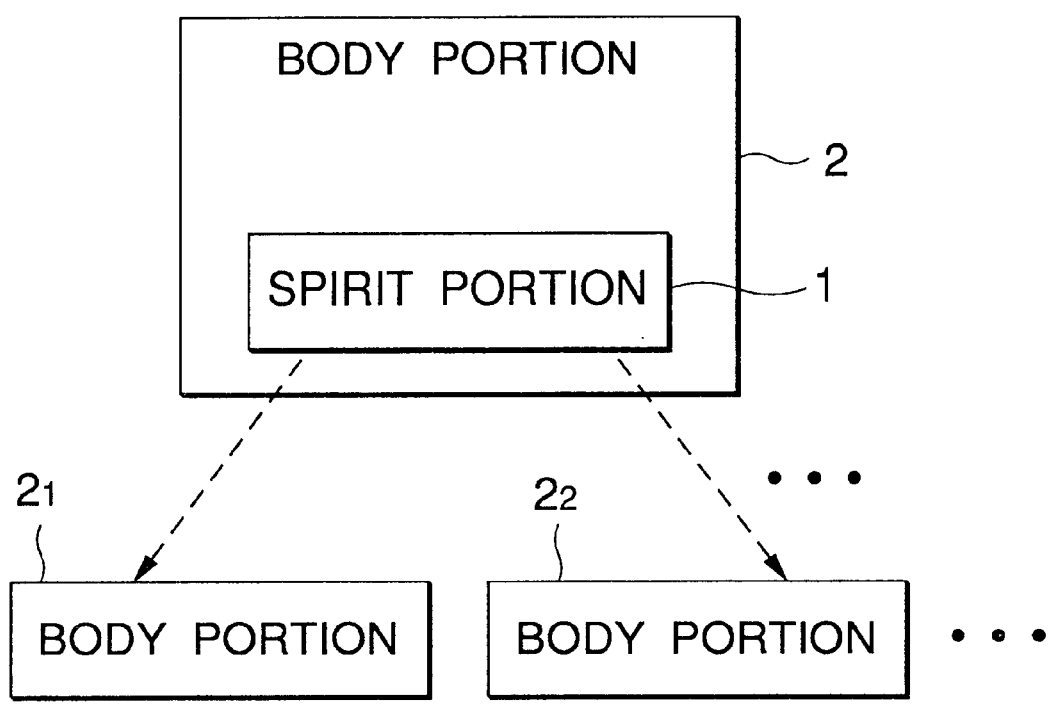
FIG. 1 is a block diagram schematically showing an embodiment of an electronic pet system to which the present invention is applied.

FIG. 1 schematically shows an embodiment of an electronic pet system (in this specification, the system is defined as a logical assembly of plural devices, and there is no limitation as to whether the respective devices are placed in the same housing or not) to which the present invention is applied.

For example, according to another view, an animal which is a living body is believed as having the body and the spirit which dwells within the body and presides over the function of mind. The electronic pet system of FIG. 1 comprises a spirit portion 1 and a body portion 2 which correspond to the spirit and the body, respectively.

That is, the spirit portion 1 functions as the spirit of the electronic pet, and represents the features of the electronic pet. The body portion 2 functions as the body of the electronic pet, and represents the action (conduct) of the electronic pet. The action of the body portion 2 is taken on the basis of the features of the electronic pet which are owned by the spirit portion 1, and thus the spirit portion 1 may be called as the core of the electronic pet (core).

The spirit portion 1 can be extracted from the body portion 2, and can dwell within other body portions $2_1$, $2_2$, ... In this case, the body portion 2 from which the spirit portion 1 is extracted is so-called cast-off skin, and it does not function as the electronic pet. On the other hand, another body portion in which the spirit portion 1 dwells functions as an electronic pet having the original features. That is, the spirit of the electronic pet can change bodies.

Figure 2:
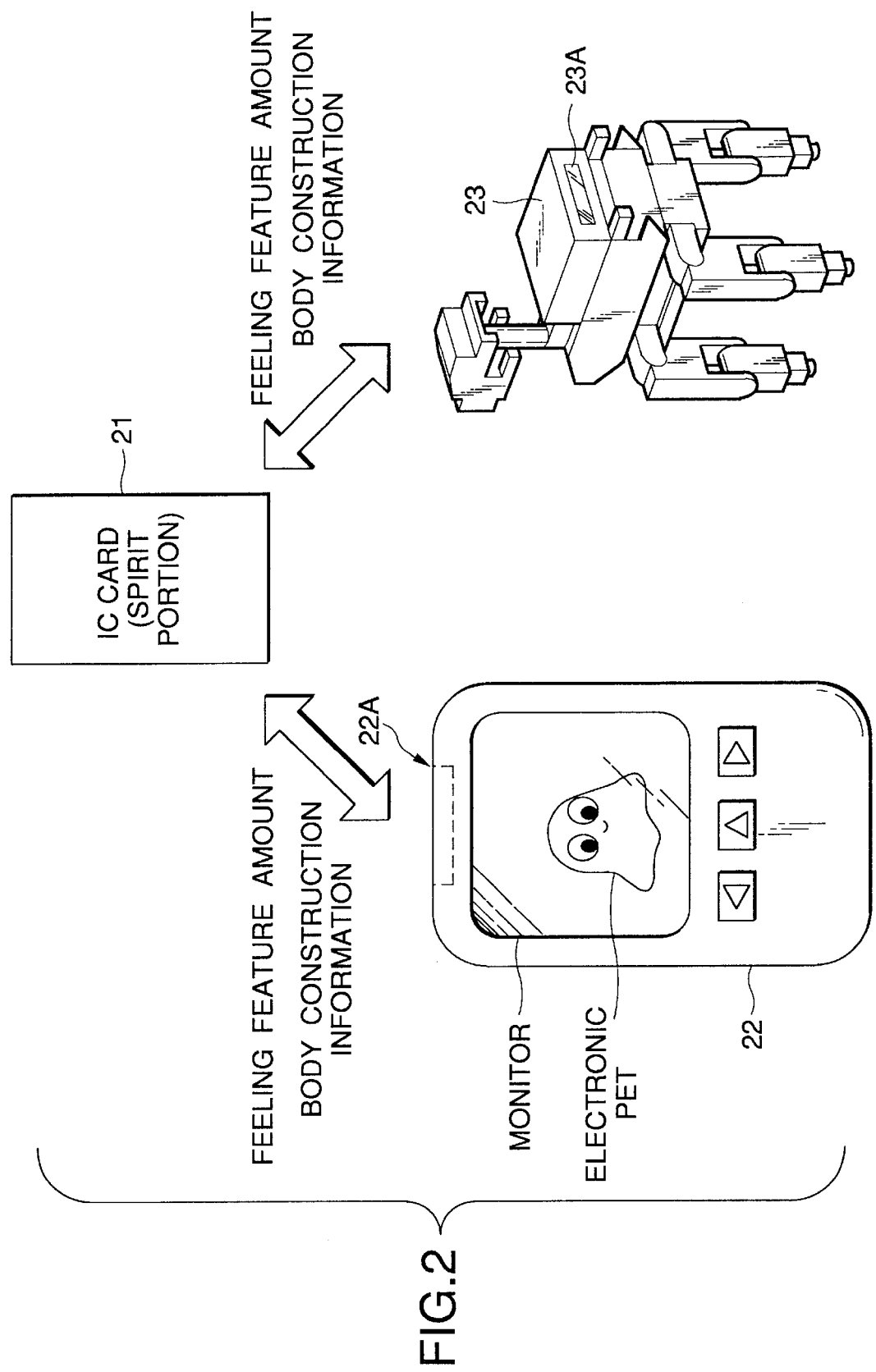
FIG. 2 is a diagram showing a more specific construction of the electronic pet system.

FIG. 2 shows a specific construction of the electronic pet system shown in FIG. 1.

The spirit portion 1 of FIG. 1 is implemented by an IC (integrated circuit) card (spirit card) 21 or the like, for example. The IC card 21 contains, for example, a flush memory or the like, and stores gene data as described later.

The body portion 2 of FIG. 1 is implemented by a virtual pet device 22, a pet-type robot 23 or the like, for example. The virtual pet device 22 comprises a portable information processing device for performing processing to display a virtual electronic pet, and it has a slot 22A in which the IC card 21 is mounted. The pet-type robot 23 is a robot having the shape of the electronic pet, and has a slot 23A in which the IC card 21 is mounted.

Each of the virtual pet device 22 and the pet-type robot 23 is a machine (body machine) which functions as the body of the electronic pet, and thus it takes no action for itself. That is, each of the virtual pet device 22 and the pet-type robot 23 which serves as a body functions as an electronic pet by inserting the IC card 21 serving as the spirit. That is, in the virtual pet device 22, the electronic pet is displayed on the monitor thereof, and action is taken on the basis of the gene data stored in the IC card 21. Further, the pet-type robot 23 also takes an action on the basis of the gene data stored in the IC card 21.

Accordingly, by inserting the IC card 21 in the slot 23A of the pet-type robot 23, a user can feel more closely as if the user actually brings up a pet. Further, during a travel, a user removes the IC card 21 from the pet-type robot 23 and mounts it in the virtual pet device 22, whereby the user can easily carry it to a travel destination.

Figure 3:
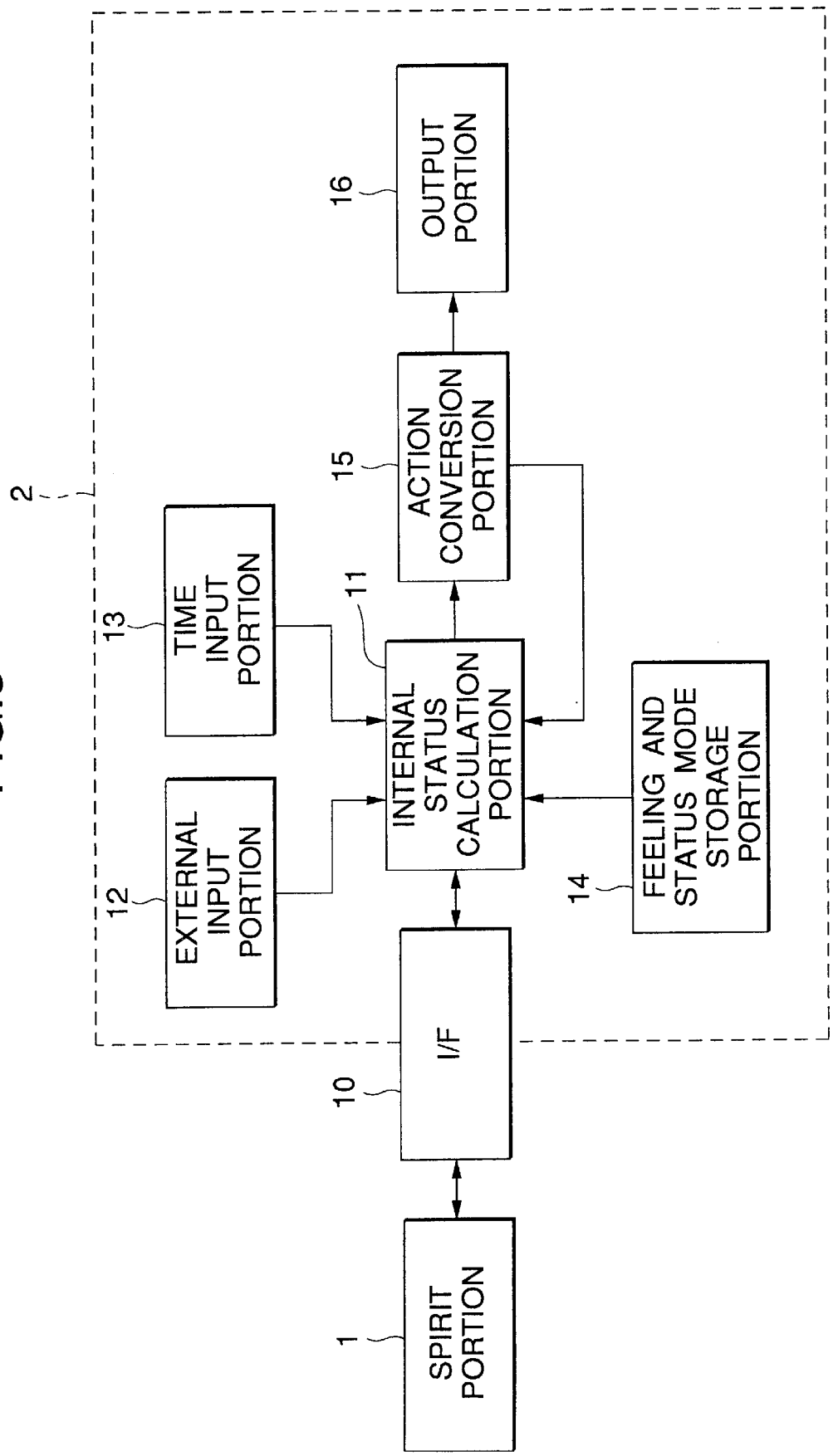
FIG. 3 is a block diagram showing a second construction of a body portion of FIG. 1.

Next, FIG. 3 shows an electrical construction of the body portion 2 of FIG. 1.

An I/F (interface) 10 corresponds to the slot 22A of the virtual pet device 22 or the slot 23A of the pet-type robot 23 in FIG. 2, and it functions as an interface for communicating data between the spirit portion 1 and the body portion 2. That is, I/F 10 reads out information representing the features of the electronic pet (gene data) from the spirit portion 1, and supplies the data to an internal status calculation portion 11. Further, I/F 10 writes into the spirit portion 1 information which is obtained as a result of a predetermined calculation in the internal status calculation portion 11, and renews the storage content thereof.

As described above, the internal status calculation portion 11 is supplied with the gene data from I/F 10, and also with inputs from an external input portion 12 and a time input portion 13. Further, a specific action of the electronic pet which is obtained in an action conversion portion 15 is also fed back to the internal status calculation portion 11. The internal status calculation portion 11 drives models of the feeling and status models stored in a model storage portion 14 in accordance with the input from I/F 10, the external input portion 12, the time input portion 13 or the action conversion portion 15 to renew the internal status of the electronic pet. The internal status of the electronic pet is contained in the gene data from I/F 10 as described later, and the renewed internal status is written into the spirit portion 1 through I/F 10. The internal status calculation portion 11 determines conceptual action which is taken by the electronic pet, and outputs to the action conversion portion 15 a command (action command) for instructing to take the conceptual action.

The external input portion 12 supplies a stimulus which is supplied from the external such as a user, an environment or the like to the internal status calculation portion 11. That is, for example, when the body portion 2 is the virtual pet device 22, the external input portion 12 comprises a keyboard (or switch or bottom), or a mike (microphone) and a voice recognizer, and an operation which is carried out by the user, for example, in order to take care of an electronic pet, or a voice which is made by the user, is converted to an electrical signal and supplied to the internal status calculation portion 11. Further, when the body portion 2 is, for example, the pet-type robot 23, the external input portion 12 comprises a keyboard, or a microphone and a voice recognizer, a photoelectric conversion element and an image recognizer, a sensor (for example, temperature sensor). Likewise, an operation which is carried out by the user in order to take care of an electronic pet or a voice which is made is converted to an electrical signal and supplied to the internal status calculation portion 11. In addition, information on surrounding objects, temperature, etc. is supplied to the internal status calculation portion 11.

The time input portion 13 counts the time (containing the date, month and year) and supplies the time (present time) to the internal status calculation portion 11.

The model storage portion 14 stores models for the feelings and the statuses of the electronic pet. That is, as the feelings of the electronic pet are set anger, sadness, pleasure, fear, surprise, dislike, etc. The model storage portion 14 stores these feeling models (for example, calculation equations for determining parameters representing these feelings). Further, as the statuses of the electronic pet are set fatigue, starvation, thirst, sleepiness, the feeling of excretion, etc., and the model storage portion 14 stores these status models.

The body portion 2 has the same feeling and status models regardless of whether it is the virtual pet device 22 or the pet-type robot 23. Accordingly, the feature and action of the electronic pet are not changed to those of a different electronic pet even when the IC card 21 is mutually replaced between the virtual pet device 22 and the pet type robot 23.

Here, in this embodiment, both the feeling and status of the electronic pet is referred to as the internal status of the electronic pet.

The action conversion portion 15 converts the conceptual action command from the internal status calculation portion 11 to a command (action command) for instruction specific action, and supplies it to an output portion 16. In addition, it is fed back to the internal status calculation portion 11.

The output portion 16 is designed to make an output in accordance with the action command from the action conversion portion 15 (makes the electronic pet take the action corresponding to the action command from the action conversion portion 15). That is, for example when the body portion 2 is the virtual pet device 22, the output portion 16 comprises a monitor, a voice synthesizer (for example, a regular voice synthesizer) and a speaker, and it varies a display of the electronic pet and outputs a cry. Further, when the body portion 2 is the pet type robot 23, the output portion 16 comprises motors for driving the members corresponding to hands, feet, body, head, etc., a voice synthesizer, a speaker, etc., and it rotates a desired motor and outputs a cry.

Figure 4:
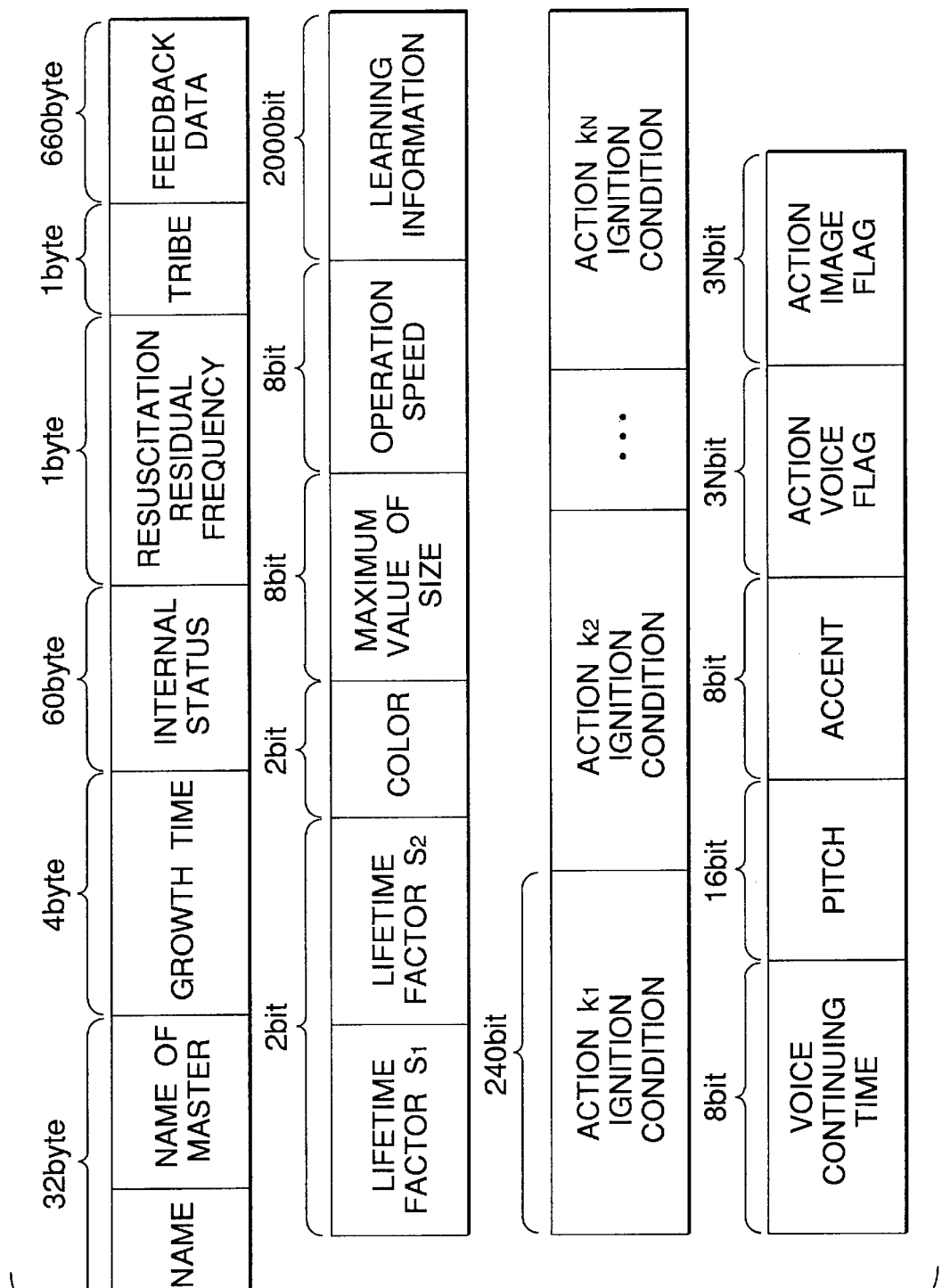
FIG. 4 is a diagram showing the format of gene data stored in a spirit portion 1 (IC card 21)

Next, FIG. 4 shows an example of the format of the gene data stored in the spirit portion 1 (IC card 21).

The name of an electronic pet and the name of a master (the name of a pet owner (user)) are arranged at first 32 bytes of the gene data. A growth time of 4 bytes is disposed subsequently to the name of the master. At that place is disposed a lapse time from the time of electronic-pet's birth until now. After that, an internal status of 60 bytes is disposed. In this internal status is disposed parameters on the current status and feeling of the electronic pet (which are obtained by representing the status and the feeling with numeral values).

A resuscitation residual frequency of one byte is disposed after the internal status. That is, in this embodiment, (the spirit of) the electronic pet can be resuscitated even when it dies, and a residual frequency at which it can be resuscitated is disposed in the resuscitation residual frequency. After that, the tribe of one byte is disposed, and the kind of the electronic pet, such as dog, cat, bird or the like is disposed at that place. The kind of the electronic pet is not necessarily limited to those of the actually-existing animals.

Further, feedback data of 660 bytes are disposed after that place. Here, as described above, in the body portion 2 (FIG. 3), (the parameter on) the internal status is renewed in accordance with the feedback from the action conversion portion 15 in the internal status calculation portion 11, and the renewal amount when the internal status is renewed is disposed at the feedback data. In the internal status calculation portion 11, the internal status is also renewed in accordance with the inputs from the external input portion 12 and the time input portion 13, and in this case, the renewal amount is also disposed as the feedback data.

Subsequently to the feedback data are successively disposed a lifetime factor of 2 bits, a color of 2 bits, the maximum value of the size of 8 bits, an operation speed of 8 bits and learning information of 2000 bits. $S_1$ and $S_2$ are provided as the lifetime factor, and the lifetime of the spirit portion 1, that is, the use term of the IC card 21 is determined by these two lifetime factors $S_1$, $S_2$. Here, the passage of the time over the use term of the IC card 21 corresponds to the death of (the spirit of) the electronic pet. The color of the electronic pet is disposed in the color. In the maximum value of the size is disposed a value which limits the size of the electronic pet when it grows up. A value for determining the operation speed of the electronic pet is disposed in the operation speed. Information as to whether the electronic pet can do tricks is disposed in the learning information. That is, in this embodiment, the electronic pet can be made to learn some tricks, and a flag indicating whether the electronic pet can do each trick is disposed in the learning information.

Action ignition conditions of N each comprising 240 bits (condition information) are disposed subsequently to the learning information. That is, in this embodiment, when the parameter of the internal status satisfies a predetermined condition, the electronic pet takes predetermined action, and the condition thereof is described in the action ignition condition. Further, in this embodiment, actions $k_1, k_2, \ldots, k_N$ of N are set, and an action ignition condition for each action is disposed.

Subsequently to the N action ignition conditions are successively disposed a voice continuing:time of 8 bits, a pitch of 16 bits, an accent of 8 bits, an action voice flag of 3N bits and an action image flag of 3N bits. Information setting the maximum continuing time, pitch and accent of the cry of the electronic pet are set in the voice continuing time, the pitch and the accent, respectively. Flags representing whether the actions of N can be representatively taken are disposed in the action voice flag and the action image flag. That is, in this case, a flag representing that a dog can run, but cannot fly, etc. are disposed.

FIG. 5 shows the details of the internal status in the gene data of FIG. 4.

In the embodiment of FIG. 5, the internal status comprises totally fifteen parameters of five parameters representing the feelings of anger, pleasure, surprise, fear and sadness and 10 parameters representing the statuses of starvation, evacuation, obedience, fatigue, thirst, sleepiness, food, drink, trick and growth. Here, starvation, evacuation, obedience, fatigue, thirst, sleepiness, trick and growth represent physical statuses in the statuses of an electronic pet, and food and drink represent environmental statuses in the statuses of the electronic pet. That is, in this embodiment, the electronic pet can be placed under such an environment that food or drink is provided, and the statuses of food and drink are varied in accordance with the environment under which the electronic pet is placed. Further, in the environment where food or drink is provided, the electronic pet is set to each food or drinks by itself (although neither food nor drink are provided by the operation of a user).

In this embodiment, each of the parameters on the internal status is set so that the minimum value thereof is equal to zero.

The parameters representing the internal statuses are not limited to the above 15.

FIG. 6 shows the details of the feedback data in the gene data of FIG. 4.

As the feedback data, in accordance with the external input (user's operation or voice) given from the external input portion 12, the time input (time lapse) given from the time input portion 13 and the internal input given from the action conversion portion 15, the renewal amount when the internal status is renewed is set every input for each item of the internal status. The renewal amount corresponding to the time lapse is set to an amount corresponding to lapse of prescribed unit time.

Accordingly, when the feeling of "anger" in the internal statuses of the electronic pet is considered, if the input corresponding to "praise" (for example, the user makes such a voice as praises the electronic pet) is given, the "anger" of the electronic pet is incremented by −200,000, that is, reduced by 200,000 (here, the reduction of the numerical value of "anger" corresponds to suppression of the feeling of anger). Further, for example, when an unit time elapses, the "anger" of the electronic pet is reduced by 1,000. Further, for example when the input corresponding to "barking" is given as the internal input (when the electronic pet takes a barking action), the "anger" of the electronic pet is reduced by 10,000.

That is, the feeling of "anger" of the electronic pet subsides when the master praises it or time elapses. Further, the feeling of "anger" of the electronic pet also subsides when it barks, that is, in accordance with the action of the electronic pet itself. This means that when the electronic pet is angry, the anger thereof is discharged by barking and the feeling of anger is suppressed.

Figure 7:
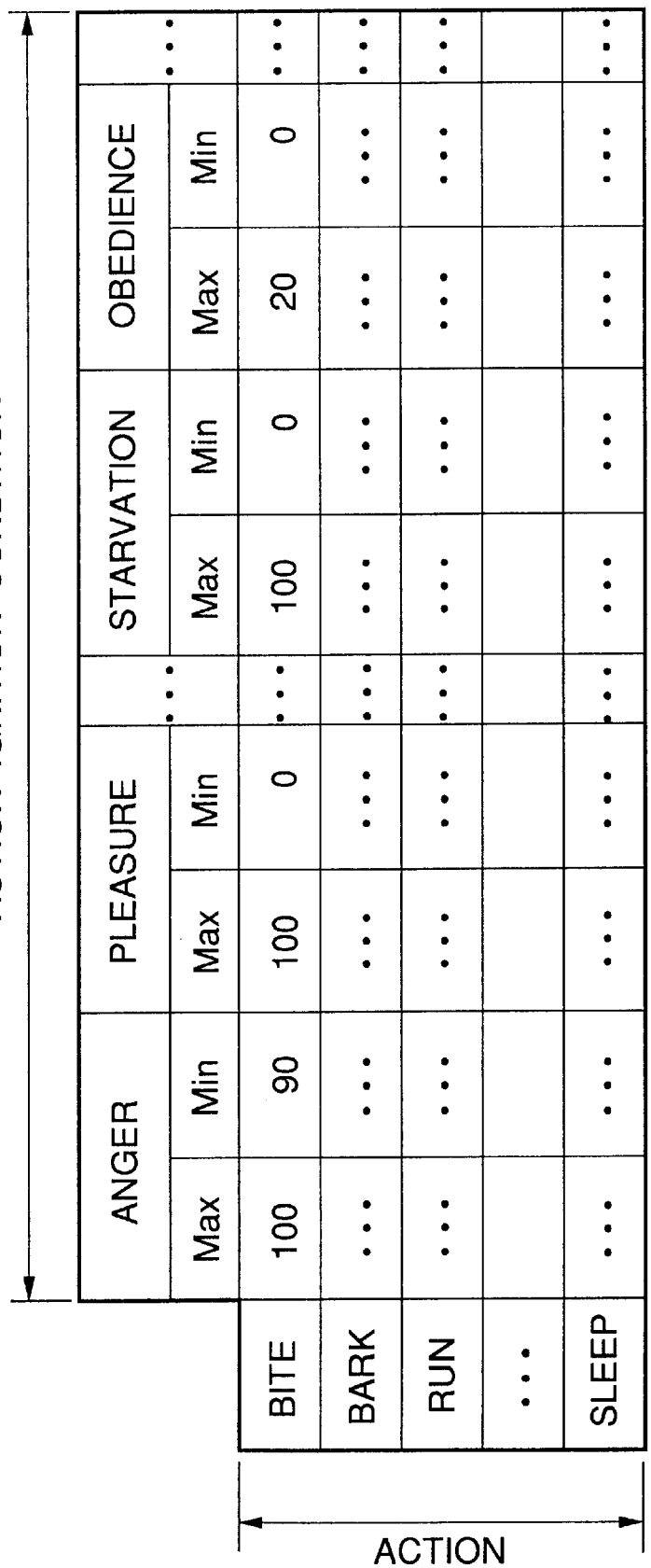
FIG. 7 is a diagram showing the details of an action ignition condition in the gene data of FIG. 4.

FIG. 7 shows the details of the action ignition condition of the gene data of FIG. 4.

The action ignition condition defines an action to be taken when the parameter of the internal status satisfies a prescribed condition (for example, "bite", "bark", "run", "walk", "cry", "absentminded", "sleep" or the like, and a condition therefor. That is, the action ignition condition on an action defines the lower limit value (Min) and the upper limit value (Max) of each parameter of the internal statue to be satisfied when the action is taken. Specifically, in the embodiment of FIG. 7, the action of "bite" occurs when the feeling of "anger" of the internal status of the electronic pet is set to 90 to 100, the feeling of "pleasure" is set to 0 to 100, . . . , the status of "starvation" is set to 0 to 100, and the status of "obedience" is set to 0 to 20, . . .

Figure 8:
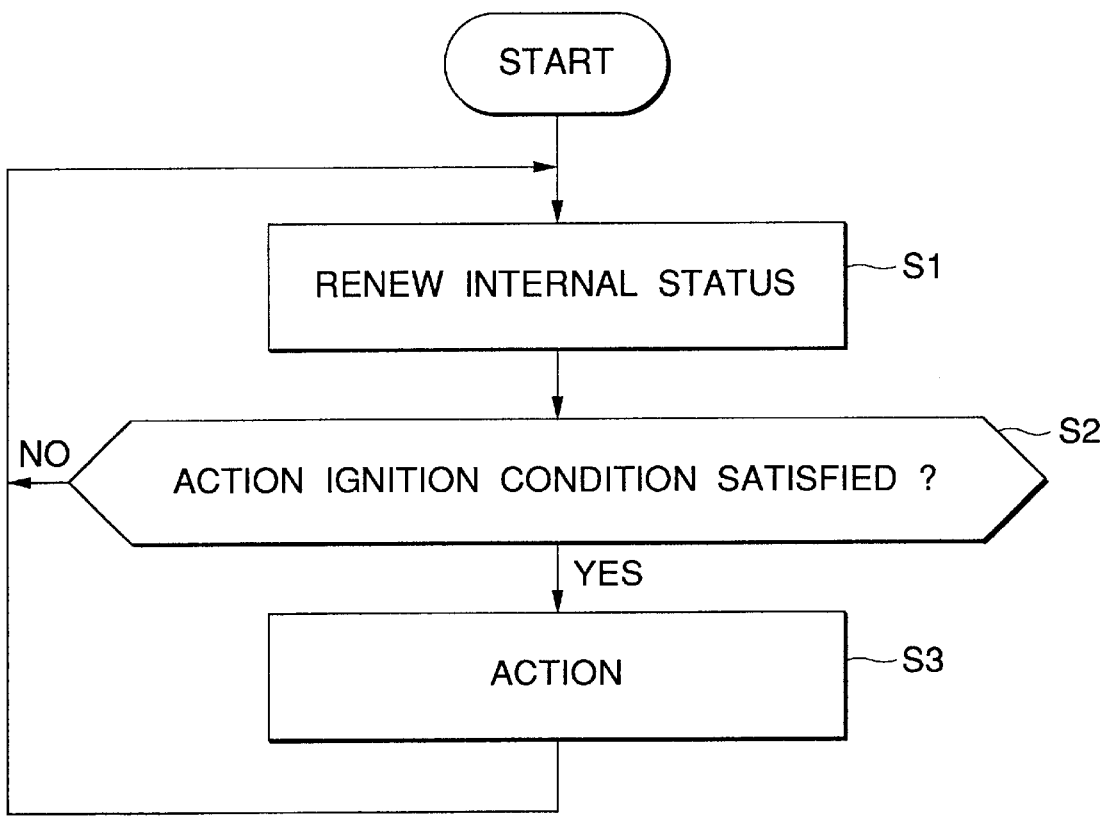
FIG. 8 is a flowchart showing the processing of the body portion 2 of FIG. 3.

Next, the operation of the body portion 2 of FIG. 3 will be described with reference to the flowchart of FIG. 8.

First, in step S1, the internal 'status calculation portion 11 renews the internal status stored in the spirit portion 1.

That is, when parameters $E_1, E_2, \ldots, E_P$ are provided as the parameters representing the internal status, the internal status calculation portion 11 renews the internal status according to the following equation, where the parameter of an internal status at a time t (here, a time with respect to the time at which the electronic pet was born (the elapse time from the time of birth of the electronic pet) is represented by $E_p(t)$ (p=1, 2, . . . , p).

$$E_p(t)=E_p(t-1)+A_k(p,t)+I_j(p,t) \quad (1)$$

Here, $A_k(p,t)$ is a renewal value of the parameter $E_p$ when an action k is taken. This is determined according to the feedback data (FIG. 4) stored in the spirit portion 1 on the basis of the feedback from the action conversion portion 15. Further, $I_j(p,t)$ is a renewal value of the parameter $E_p$ when an input j is given from the external input portion 12, and this is determined according to the feedback data stored in the spirit portion 1 on the basis of the input.

In this case, the renewal amount $A_k(p,t)$ is a function of time t, and this is to make the renewal amount $A_k(p,t)$ variable as the electronic pet grows up. Specifically, for example, there is a case where the electronic pet sensitively reacts to a stimulus when it is a baby, but it reacts more slowly as it grows up. In order to realize such a growth-dependent variation, the renewal amount $A_k(p,t)$ is set to a function of time t. The renewal amount $A_k(p,t)$ at a time t can be calculated (generated) without directly storing the value thereof into the spirit portion 1 by storing the renewal amounts $A_k(p,T1)$, $A_k(p,T2)$, . . . at some predetermined times T1, T2, . . . into the spirit portion 1 and performing linear interpolation with these values. Further, when it is unnecessary to continuously vary the renewal amount $A_k(p,t)$ with respect to t, $A_k(p,T1)$ is used as the renewal amount for the time period from 0 to T1, and $A_k(p,T2)$ is used as the renewal amount for the time period from T1 to T2. Subsequently, the renewal amount being used may be selected in accordance with the time and varied in the same manner.

The renewal amount $I_j(p,t)$ is also a function of time t, and this is for the same reason as the renewal amount $A_k(p,t)$ is a function of time t.

In this embodiment, the time t is varied with 100 ms set to 1.

When renewing the internal status stored in the spirit portion 1, the internal status calculation portion 11 goes to step S2 to judge whether the internal status after the renewal satisfies any one of the action ignition conditions of N stored in the spirit portion 1. At this time, the judgment is performed as follows.

That is, in the action ignition condition stored in the spirit portion 1 are set the minimum value and the maximum value of the internal status for taking the action as shown in FIG. 7. Now, representing the minimum value or the initial value for the parameter $E_p$ of the internal status defined in the action ignition condition for an action k by $cmin_p(k)$ or $cmax_p(k)$, the action ignition condition for the action k is satisfied, for example when the function $f(E_1, E_2, \ldots, E_p)$ represented by the following equation is equal to 1.

$$f(E_1, E_2, \ldots, E_p)=(cmin_1(k)<E_1<cmax_1(k))$$
$$\& \ (cmin_2(k)<E_2<cmax_2(k))$$
$$\& \ (cmin_p(k)<E_2<cmax_p(k)) \quad (2)$$

Here, in the above equation, & represents logical product. The right side of the above equation $(cmin_p(k)<E_1<cmax_p(k))$ is equal to 1 or 0 when the condition in parentheses is satisfied or not satisfied.

In step S2, when it is judged that there is an action ignition condition under which the equation (2) is equal to 1, the internal status calculation portion 11 goes to step S3 so as to output an command to the action conversion portion 15 so that the electronic pet takes the action corresponding to the action ignition condition, and then returns to step S1. If there are plural action ignition conditions under which the equation (2) is equal to 1, one of them is randomly selected, and a command for instructing to take the action corresponding to the action ignition condition thus selected is output to the action conversion portion 15. However, when two or more of the actions corresponding to the plural action ignition conditions can be simultaneously performed, a command for instructing to take the two or more actions can be output to the action conversion portion 15. Specifically, with respect to the actions of "walk" and "barking" for example, not only any one of them, but also both of them can be performed simultaneously.

On the other hand, if it is judged in step S2 that there is no action ignition condition under which the equation (2) is equal to 1, the processing skips step S3 and returns to step S1 to repeat the processing from step S1. That is, in this case, the electronic pet takes no action (a command to make the electronic pet take a waiting action is output from the internal status calculation portion 11 to the action conversion portion 15).

Here, as described above, the internal status is renewed on the basis of the feedback data, and the action of the electronic pet is determined on the basis of whether the internal status after the renewal satisfies the action ignition condition. Therefore, if the feedback data is different or the action ignition condition is different although the internal status before the renewal is the same, the electronic pet takes a different action. Accordingly, the feedback data and the action ignition condition can be regarded as information for setting the character of the electronic pet (character/action tendency setting information).

As in the case of the above renewal amount $A_k(p,t)$ and $I_j(p,t)$, the action ignition condition may be set as a function of time t, and varied as the electronic pet grows up.

Figure 9:
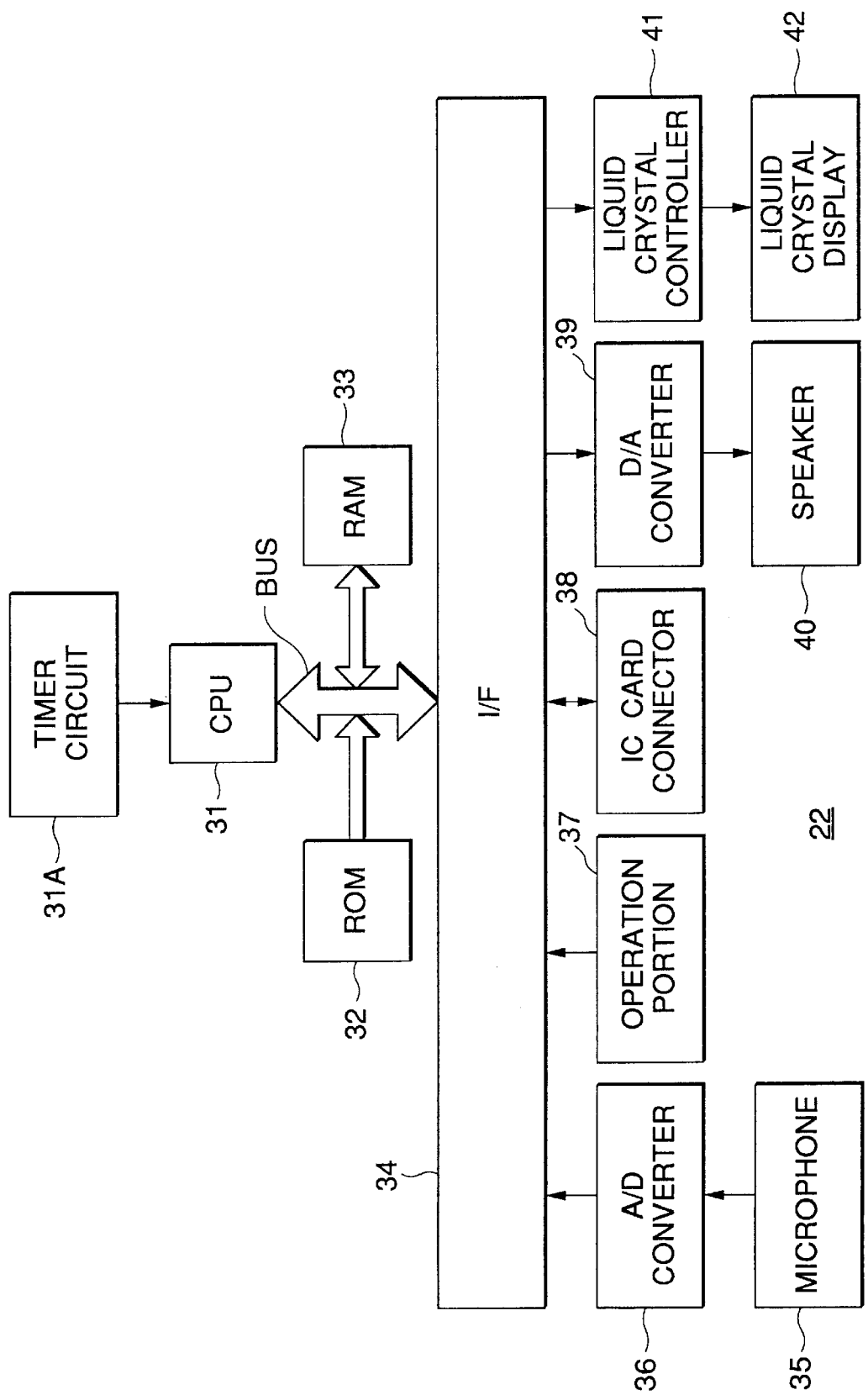
FIG. 9 is a block diagram showing the hardware construction of a virtual pet device 22 of FIG. 2.

Next, FIG. 9 shows the hardware construction of the virtual pet device 22 of FIG. 2.

CPU (central processing unit) 31 performs various processing in accordance with programs stored in ROM (read only memory) 32. A timer circuit 31A counts clocks not shown, and generates a timer interrupt of CPU 31 every predetermined unit time (for example, as described above, 100 ms) on the basis of its count value.

ROM 32 stores programs to be executed by CPU 31 and data required to execute the programs. RAM (random access memory) 33 stores data which are required for the operation of the CPU 31. I/F 34 functions as an interface among an A/D converter 36, an operation portion 37, an IC card connector 38, a D/A converter 39 and a liquid crystal controller 41.

CPU 31, ROM 32, RAM 33 and I/F 34 of the above elements are mutually connected to one another through buses (address bus, data bus, etc.).

A mike (microphone) 35 converts a voice input thereto (for example, contains a whistle sound and other sounds) to an audio signal as an analog electrical signal and supplies it to the A/D converter 36. The A/D converter 36 subjects subjects the analog audio signal from the mike 35 to A/D conversion, and outputs it as a digital audio signal through I/F 34 to CPU 31. Here, when receiving the audio signal as described above, CPU 31 subjects the audio signal to a linear prediction analysis to extract the feature amount thereof and further performs voice recognition on the basis of HMM (Hidden Markov Model) method. Here, a program which is executed for the voice recognition of CPU 31 and a word model which is targeted for the voice recognition are stored in ROM 32, for example. In this case, as the word model targeted for the voice recognition are stored word models with which the master speaks to a pet (for example, "Hey", "Good child", "Good Morning", "Good Night", "Give me your foot", "Sit down", "What are you doing", etc.).

The acoustic analysis method is not limited to the linear prediction analysis and the voice recognition method is not limited to the HMM method.

The operation portion 37 comprises various buttons and keys, and upon user's operation, the signal corresponding to the operation is supplied from I/F 34 to CPU 31, whereby the buttons or keys which the user operates can be recognized in CPU 31. The operation portion 37 has buttons for input various types of inputs to the electronic pet, such as a "scold" button operated to scold the electronic pet, a "praise" button to praise the electronic pet, a "greeting" button corresponding to speaking of "good morning" or "good night", a "give me your foot" button and a "sit" button which are operated to command "give me your foot" and "sit" as tricks.

The IC card connector 38 is provided in the slot 22A (FIG. 2) of the virtual pet device 22, and when the IC card 21 is mounted in the slot 22A, the IC card 21 and CPU 31 are electrically connected to each other through I/F 34. Here, CPU 31 reads out and writes in data to the IC card 21 through I/F 34 and the IC card connector 38. CPU 31 can detect the mount or non-mount of the IC card 21.

The D/A converter 39 performs D/A conversion on the digital audio signal supplied from CPU 31 through I/F 34, and supplies it as an analog audio signal to a speaker 40.

The speaker 40 contains an amplifier therein, and amplifies and outputs the voice from the D/A converter 39. Here, if necessary, CPU 31 generates the cry of the electronic pet or other necessary sounds by voice synthesization, and outputs it through I/F 34 to the D/A converter 39. The program to perform the voice synthesization and the data required to the voice synthesization are stored in ROM 32, for example.

The liquid crystal controller 41 is controlled by CPU 31 through I/F 34 to display various images (for example, the image of the electronic pet, etc.) and characters on a liquid crystal display portion 42. The liquid crystal display portion 42 displays images and characters under the control of the liquid crystal controller 41. ROM 32 stores a program for controlling the liquid crystal controller 41 to make the liquid crystal display portion 42 display the images and the characters, and CPU 31 executes this program to make the liquid crystal display portion 42 display the images and the characters.

Figure 10:
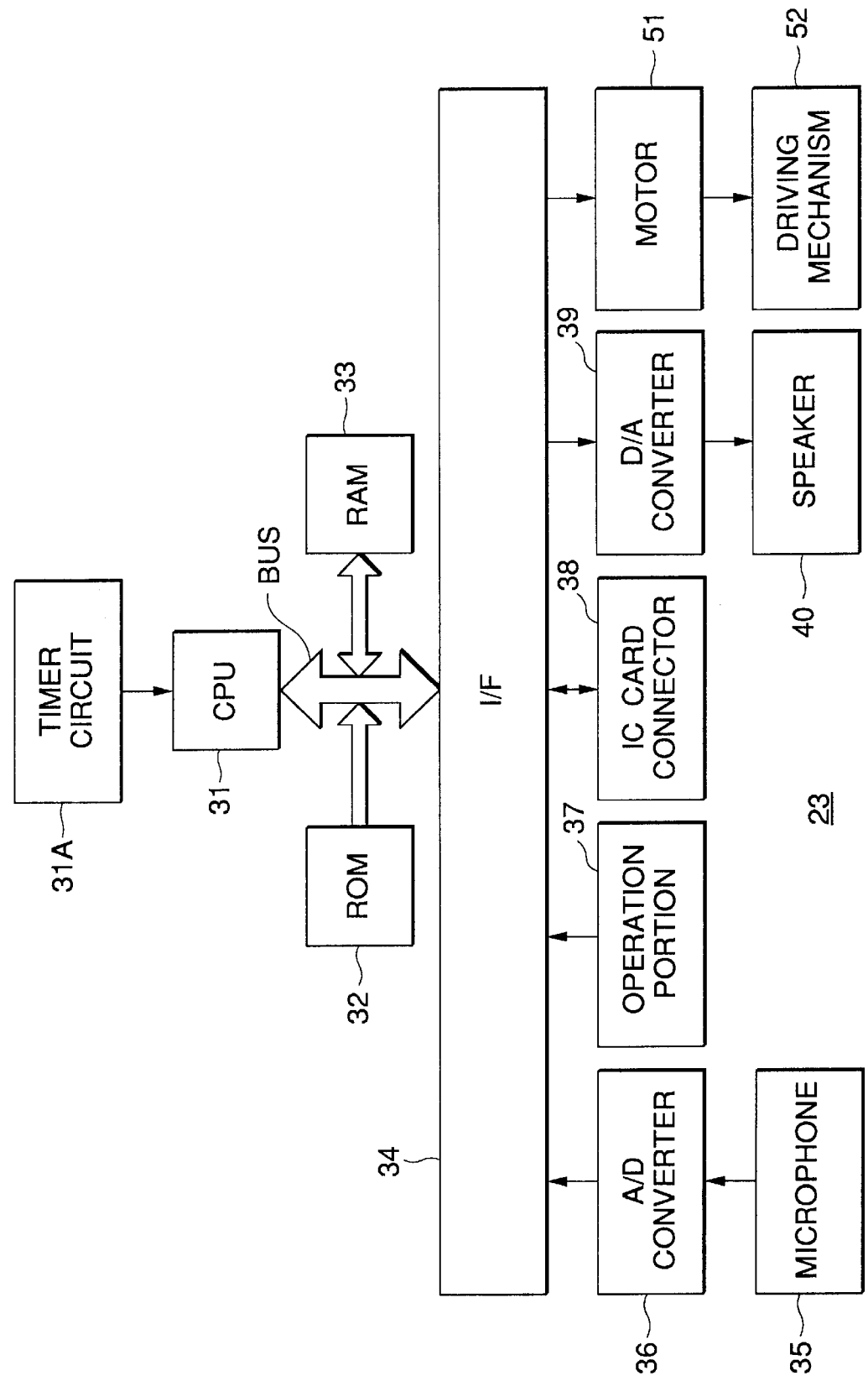
FIG. 10 is a block diagram showing the hardware construction of a pet type robot 23 of FIG. 2.

Next, FIG. 10 shows the hardware construction of the pet type robot 23 of FIG. 2. In FIG. 10, the portions corresponding to those of the virtual pet device 22 of FIG. 9 are represented by the same reference numerals. That is, the pet type robot 23 has basically the same construction as the virtual pet device 22 except that a motor 51 and a driving mechanism 52 are provided in place of the liquid crystal controller 41 and the liquid crystal display portion 42.

The motor 51 is controlled through I/F 34 by CPU 31 to drive the driving mechanism 52. The driving mechanism 52 constitutes the head, the hands, the feet and the body as movable portions of the pet type robot 23, and it is driven by the motor 51.

The I/F 10 of FIG. 3 corresponds to the I/F 34 of FIGS. 9 and 10 and the IC card connector 38, and the internal status calculation portion 11 and the action conversion portion 15 of FIG. 3 correspond to CPU 31 and ROM 32 of FIGS. 9 and 10. The external input portion 12 of FIG. 3 corresponds to the mike 35 and the A/D converter 36 and the operation portion 37 of FIGS. 9 and 10. Further, the time input portion 13 of FIG. 3 corresponds to the timer circuit 31A of FIGS. 9 and 10, and the model storage portion 14 of FIG. 3 corresponds to ROM 32 of FIGS. 9 and 10. The output portion 16 of FIG. 3 corresponds to the D/A converter 39 and the speaker 40 of FIGS. 9 and 10, the liquid crystal controller 41 and the liquid crystal display portion 42 of FIG. 9 and the motor 51 and the driving mechanism 52 of FIG. 10.

Next, the processing of CPU 31 which constitutes the virtual pet device 22 shown in FIG. 9 and the pet type robot 23 shown in FIG. 10 as the body portion will be described with reference to the flowchart of FIG. 11.

When the IC card 21 is mounted in the IC card connector 38 and a power source is turned on, action control processing to control the action of the electronic pet is carried out in the CPU 31.

That is, CPU 31 resets each block to the initial state, whereby the storage value of RAM 33 is cleared and the count value of the timer circuit 31A is reset, for example.

Thereafter, the count of the clock by the timer circuit 31A is started, and in step S11 it is judged whether a prescribed unit time (as described above, 100 ms) elapses. Here, the timer circuit 31A counts the clock, and generates a timer interrupt to CPU 31 when the count value is equal to the value corresponding to the prescribed unit time, and further it resets the count value and repeats the counting of the clock. In step S11 it is judged on the basis of the timer interrupt by the timer circuit 31A whether the prescribed unit time elapses.

If it is judged in step S11 that the prescribed unit time does not elapse, the processing returns to step S11. If it is judged in step S11 that the prescribed unit time elapses, the processing goes to step S12 in which CPU 31 recognizes the external input and the internal input.

That is, when a voice is input to the mike 35, the audio signal thereof is subjected to A/D conversion in the A/D converter 36, and supplied as an external input through I/F 34 to CPU 31. CPU 31 receives the audio signal thereof and performs the voice recognition in step S12 as described above. When any button constituting the operation portion 37 is operated, the operation signal corresponding to the operation is supplied from I/F 34 to CPU.31 as an external input. CPU 31 receives the operation signal thereof, and recognizes in step S12 which button is operated.

Here, the word which is targeted for the voice recognition and each button constituting the operation portion 37 are associated with each other by its concept. That is, when "Hey", "Good child", "Good morning", "Good night", "Give me your foot", "Sit", "What are you doing" are targeted for the voice recognition as de scribed above and the operation portion 37 contains a "scold" button, a "praise" button, a "greeting" button, a "give me your foot" button and a "sit" button, the word "hey" and the "scold" button, the word "good child" and the "praise" button, the words "good morning" and "good night" and the "greeting" button, the word "give me your foot" and the "give me your foot" button, and the word "sit" and the "sit" button, which are respectively to input the respective equivalent concepts, are associated with each other. With respect to the word and the button which are associated with each other, it is recognized that the same input is given when the word is input or when the button is operated. That is, in CPU 31, even when the voice "hey" is input or even when the "scold" button is operated, it is recognized that an input to scold the electronic pet is given in any case.

In step S12, in addition to the recognition of the external input as described above, the internal input is also recognized. That is, in step S19 as described later, when the electronic pet takes an action, identification information to identify the action is written in a prescribed address of RAM 33, and CPU 31 accesses the address to receive the identification information, and recognizes as the internal input the action taken by the electronic pet on the basis of the identification information.

Figure 11:
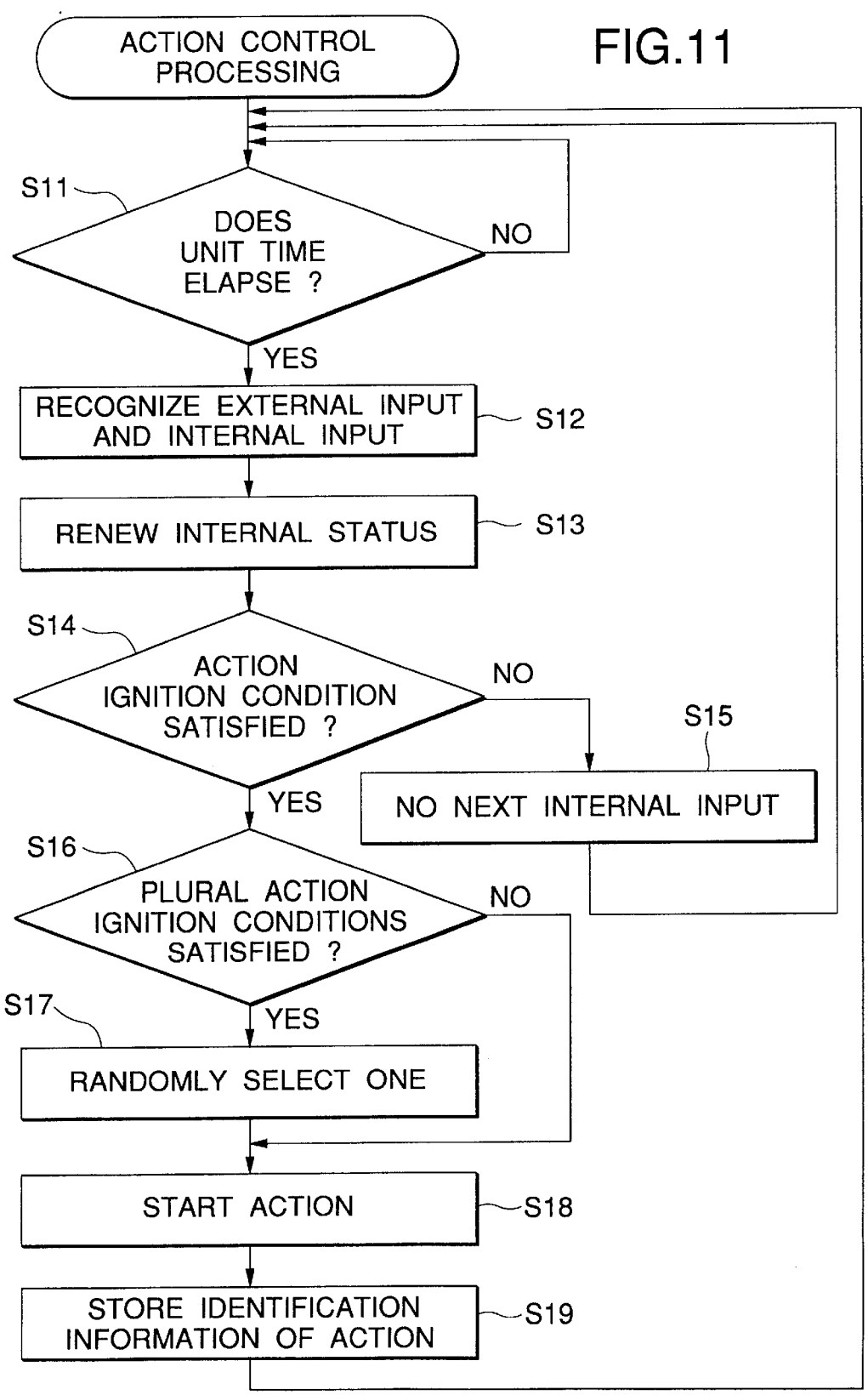
FIG. 11 is a flowchart showing action control processing which is performed by CPU 31 of FIGS. 9 and 10.

In the embodiment of FIG. 11, the flowchart is illustrated as the respective processing is sequentially performed in CPU 31 for convenience's sake of description. Actually, in CPU 31, various kinds of processing are performed in parallel in the sled which is allocated to the processing, so that the input of the voice and the operation of the operation portion 37 can be performed at all times, and the recognition processing of the external input and the internal input in step S12.

After the recognition of the external input and the internal input, the processing goes to step S13 to renew the internal status (FIG. 5) in accordance with the external input, the internal input and the time input.

That is, CPU 31 refers to gene data stored in the IC card 21 through I/F 34 and the IC card connector 38 to recognize the feedback data for each item of the internal status which corresponds to each of the external input and the internal input recognized in step S12. Further, CPU 31 recognizes the feedback data for each item of the internal status which corresponds to the time input. CPU 31 adds the feedback data (FIG. 6) for each item of the internal status corresponding to each of the external input, the internal input and the time input to the parameter of the item of the corresponding internal status, and supplies the addition value as a renewal value of the parameter of each item of the internal status to the IC card 21 and stores it therein.

When there is no external input during the time period from the previous timer interrupt until the current timer interrupt, the feedback data corresponding to the external input is set to zero. Further, when the electronic pet takes no action during the time period from the previous timer interrupt until the current timer interrupt, it is judged that there is no internal input instep S15 as described later, and the feedback data corresponding to the internal input is also set to zero. However, even when there is neither external input nor internal input, the internal status is renewed by the feedback data corresponding to the time input. That is, the internal status is renewed every time timer interrupt occurs and in accordance with at least time lapse.

After the internal status is renewed, the processing goes to step S14 in which CPU 31 refers to gene data again to judge whether the internal status after the renewal satisfies any action ignition condition (FIG. 7). If it is judged in step S14 that the internal status after the renewal does not satisfy any action ignition condition, the processing goes to step S15 to judge that there is no internal input at the next timer interrupt time, and returns to step S11.

Further, it is judged in step S14 that the internal status after the renewal satisfies any action ignition condition, the processing goes to step S16 to judged whether the internal status after the renewal satisfies plural action ignition conditions. If it is judged in step S16 that the internal status after the renewal satisfies plural action ignition conditions, the processing goes to step S17 to randomly select any one of the actions corresponding to the plural action ignition conditions, and the processing goes to step S18. In step S18, a necessary block is controlled so that the selected action is taken, and the processing goes to step S19.

That is, for example, when the action selected in step S17 is "barking", CPU 31 generates the audio signal corresponding to the cry of the electronic pet, and outputs it from the speaker 40 through I/F 34 and the D/A converter 39. Further, CPU 31 generates the graphics data of the electronic pet under barking, and supplies it to the liquid crystal controller 41, thereby displaying the barking electronic pet on the liquid crystal display portion 42. Alternatively, CPU 31 controls the motor 51 to drive the driving mechanism 52 corresponding to the mouth as if the electronic pet barks.

On the other hand, if it is judged in step S16 that the internal status after the renewal does not satisfy plural action ignition conditions, that is, if the internal status satisfies a certain action, the processing skips step S17 and goes to step S18 to control a desired block so that the action corresponding to the action ignition condition which is satisfied by the internal status is taken, and then the processing goes to step S19.

In step S19, the identification information of the action of the electronic pet which is taken in step S18 is written into a prescribed address of RAM 33, and the processing returns to step S11.

In the embodiment of FIG. 11, when the internal status satisfies plural action ignition conditions, the action corresponding to one of them is randomly selected, and the electronic pet is made to take the action. Besides, for example, priorities may be assigned to the actions so that the action having the highest priority is taken. Further, in the case where the internal status satisfies plural action ignition conditions, if two or more of the actions corresponding to the plural action ignition conditions can be simultaneously performed, all the actions which can be simultaneously taken may be simultaneously performed.

In the embodiment of FIG. 11, in step S13 the internal status after the renewal is written into the IC card 21. Besides, for example, after the IC card 21 is mounted in the IC card connector 38, the gene data stored therein may be copied to RAM 33 to rewrite the gene data (internal status) stored in RAM 33. However, in this case, before the IC card 21 is detached from the IC card connector 38, the gene data on RAM 33 are required to be written into the IC card 21 (the gene data stored in the IC card 21 are renewed).

Next, as described above, the feedback data and the action ignition condition are character/action tendency setting information for setting the character or action tendency of the electronic pet, and thus when these are renewed, the character or action tendency of the electronic pet is also varied. That is, for example, if the action ignition condition of the barking action is moderated, the electronic pet barks frequently. On the other hand, if the action ignition condition of the barking action is severe, the electronic pet barks little.

Accordingly, for example in the case where the electronic pet barks, when the master (user) praises, the action ignition condition of the barking action is varied to be moderate. Conversely, when the master angers, the action ignition condition of the barking action is renewed to be severe. Accordingly, the character or action tendency of the electronic pet can be varied in accordance with the attitude of the master. That is, the electronic pet can learn.

Figure 12:
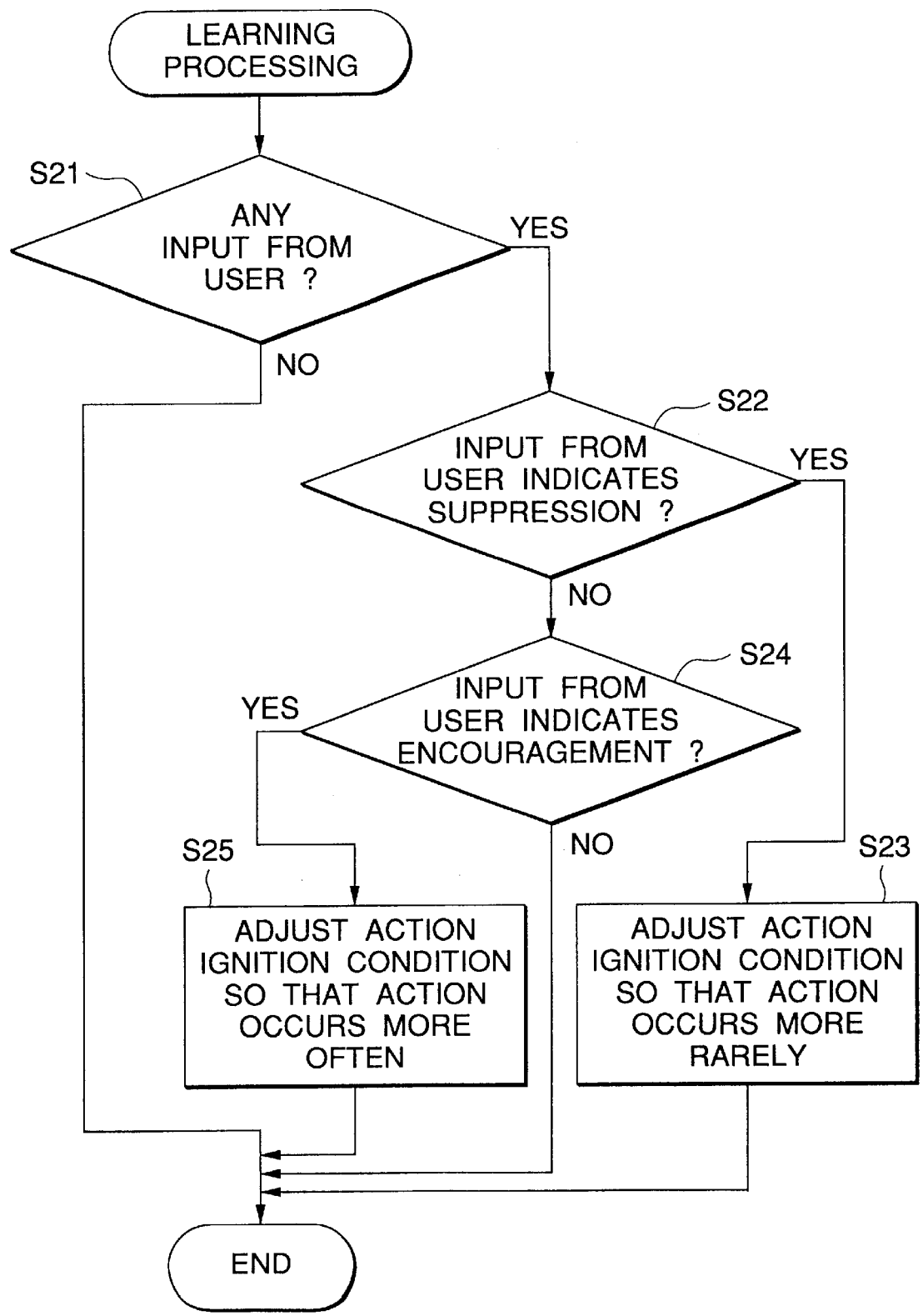
FIG. 12 is a flowchart showing learning processing which is performed by CPU 31 of FIGS. 9 and 10.

The flowchart of FIG. 12 shows the learning processing which CPU 31 executes to make the electronic pet learn.

The learning processing is carried out when the electronic pet takes an action.

That is, when the electronic pet takes an action, specifically, the identification information of the action which is taken by the electronic pet in step S18 of FIG. 11 is written in a prescribed address of RAM 33 in step S19, the learning processing is started, and in step S21 it is judged whether there is some input (external input) from the user for the action. In step S21, it is judged that there is no input, the learning processing is finished.

If it is judged in step S21 that there is some input from the user for the action taken by the electronic pet, the processing goes to step S22 to judge whether the input is to instruct suppression of the action. In step S22 it is judged that the input from the user is to instruct the suppression of the action, that is, the input from the user is the voice of "Hey" or the operation signal corresponding to the "scold" button, the processing goes to step S23 so that the action ignition condition corresponding to the action taken by the electronic pet (the action specified by the identification information stored on RAM 33) is renewed so that the probability of the occurrence of the action is reduced (the action ignition condition is set to be severe), and the learning processing is finished.

On the other hand, if it is judged in step S22 that the input from the user is not to instruct the suppression of the action, the processing goes to step S24 to judge whether the input is to encourage the action. If it is judged in step S24 that the input from the user is not to encourage the action, that is, if the input from the input is neither to suppress the action nor to encourage the action, the learning processing is finished.

Further, if the input from the user is judged in step S24 to encourage the action, that is, if the input from the user is the voice of "good child" or the operation signal corresponding to the "praise" button, the processing goes to step S25 to renew the action ignition condition corresponding to the action taken by the electronic pet so that the probability of the occurrence of the action is reduced (the action ignition condition is moderated), and the learning processing is finished.

By the learning processing as described above, the discipline of the electronic pet can be performed.

Figure 13:
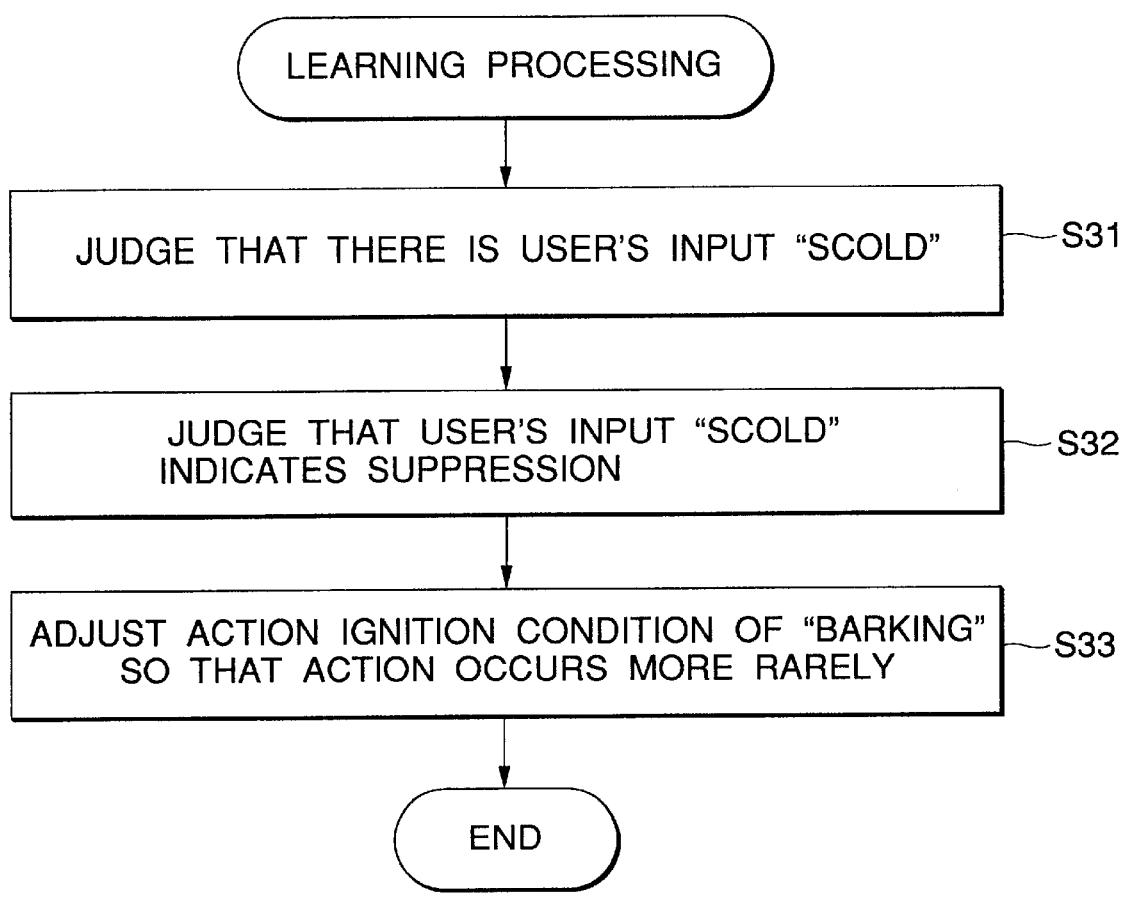
FIG. 13 is a flowchart showing the discipline of an electronic pet by the learning processing.

That is, for example, when the electronic pet barks, the external input of scolding to suppress the barking action is given from the user, whereby it is judged in the learning processing that there is an input from the user (step S31) as show in the flowchart of FIG. 13. Further, the external input of the scolding from :the user is judged to suppress the action step S32). The action ignition condition of the barking action is renewed so that the probability of the occurrence of the action is reduced (step S33).

As a result, the electronic pet barks little.

The judgment as to whether the external input from the user is to suppress the action or to encourage the action may be performed, for example, by adding a flag of 1 bit representing one of them to each item of the external input shown in FIG. 6 and making the judgment on the basis of the flag. The renewal of the action ignition condition so that the probability of the occurrence of the action is reduce or increased basically means that the difference between the lower limit value and the upper limit value shown in FIG. 6 is reduced or increased, and more strictly, the renewal method of the action ignition condition is varied in accordance with the item of the internal status and the action.

Next, according to the learning processing as described above, the electronic pet can learn tricks.

That is, as described with reference: to FIG. 5, "trick" is provided as an item of the internal status of the electronic pet, and the item "trick" is divided into specific trick items as shown in FIG. 14. In the embodiment of FIG. 14, the item "trick" is divided in to specific tricks "give me your foot", "sit", . . . .

Figure 15:
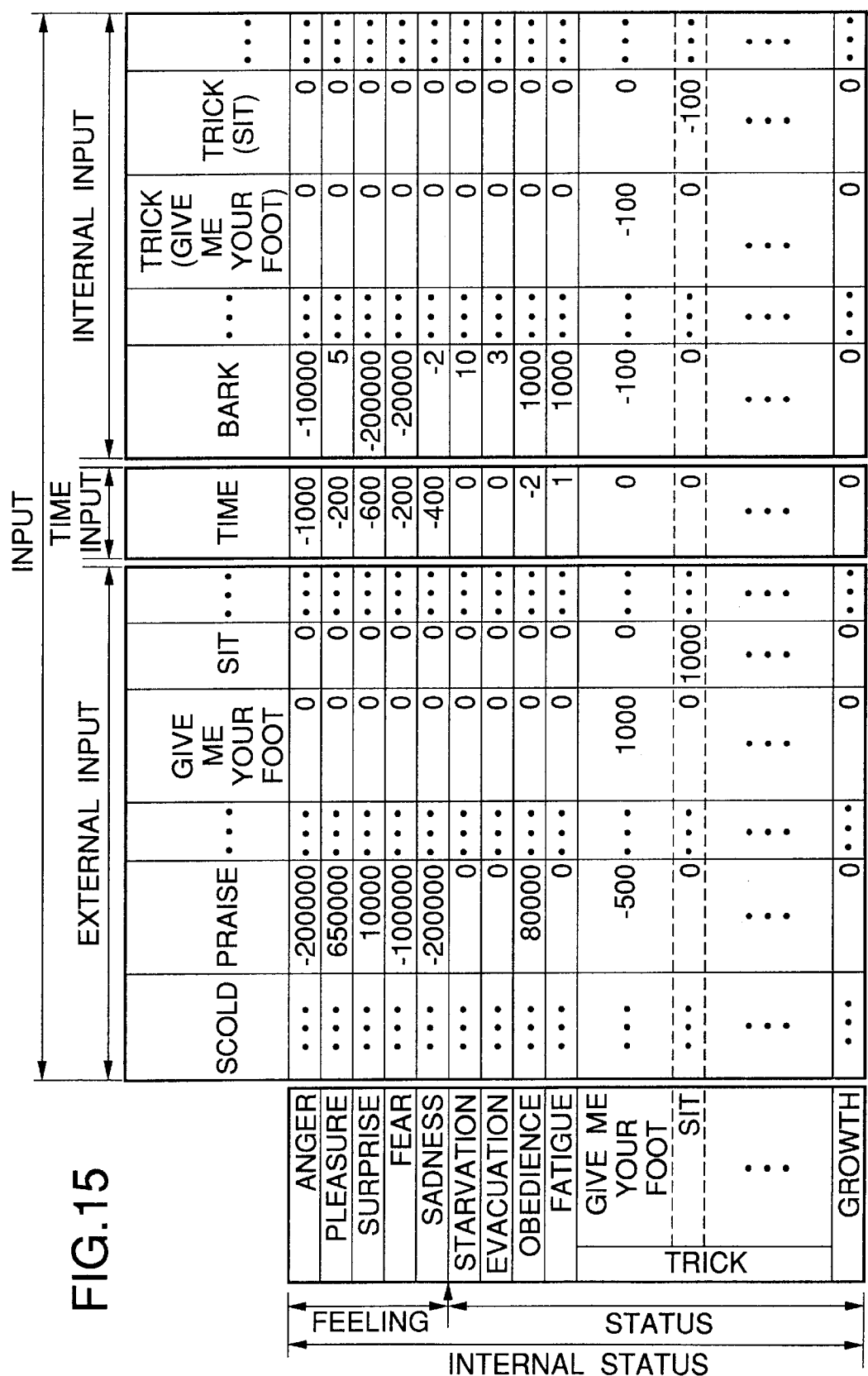
FIG. 15 is a diagram showing the details of feedback data in the gene data of FIG. 4.

In association with this, in the feedback data, the items corresponding to the specific tricks (internal status) "give me your foot", "sit", . . . are set for each of the external input, the time input and the internal input as shown in FIG. 15. Further, items on the inputs of the user which are associated with the tricks "give me your foot", "sit", etc. are provided for the external input, and also items on the tricks (actions) "give me your foot", "sit", etc. are provided for the internal input.

Figure 16:
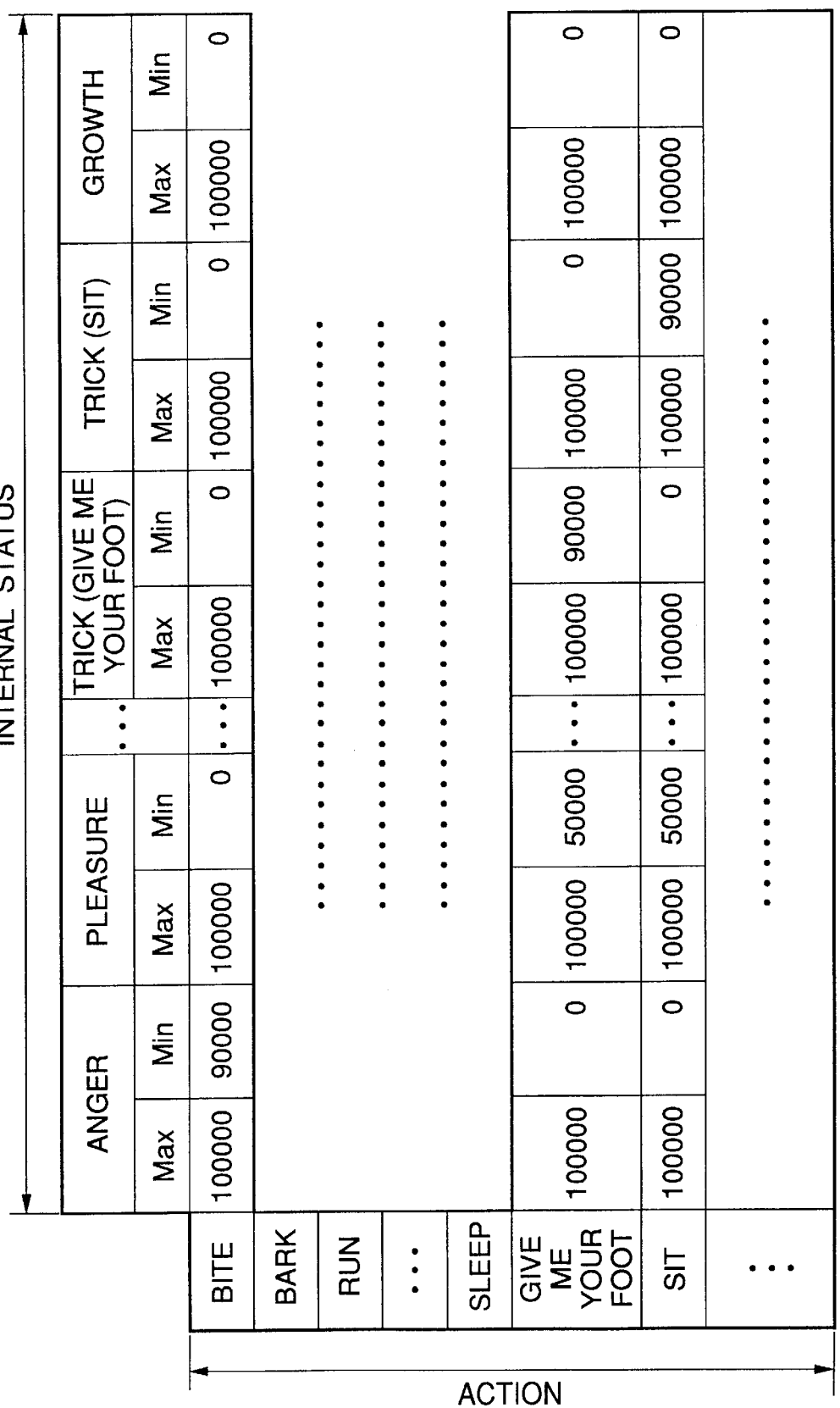
FIG. 16 is a diagram showing the details of an action ignition condition in the gene data of FIG. 4.

With respect to the action ignition condition, as shown in FIG. 16, there are provided action ignition conditions when the specific tricks (actions) "give me your foot", "sit", etc. are taken.

According to the embodiment of FIG. 15, the parameter of the internal status "give me your foot" is incremented by every 1000 units if there is an external input "give me your foot", that is, if the user utters the voice "give me your foot". As shown in the embodiment of FIG. 16, when the internal status "give me your foot" is equal to a value above 90000 and below 100000, and the other values are set to predetermined values, so that all the internal statuses satisfy the actin ignition condition of the action "give me your foot", the electronic pet takes the action "give me your foot".

That is, assuming that the internal status is only "give me your foot", when the user repetitively utters the voice "give me your foot", the parameter of the internal status "give me your foot" is incremented by every 1000, and when it reaches 90000 or more, the electronic pet takes the action "give me your foot". If the action "give me your foot" is continued, as shown in FIG. 15, the parameter of the internal status "give me your foot" is reduced by every 100 units on the basis of the feedback data corresponding to the internal input "give me your foot". Therefore, when the value does not satisfy the action ignition condition of the action "give me your foot", that is, if it is less than 90000, the electronic pet stops the action "give me your foot".

It may be adopted that the item on the trick is not beforehand provided to the internal status, the feedback data and the action ignition condition, but it is subsequently added by the learning.

That is, in the virtual electronic pet device 22, the external input "give me your foot" and the internal status, the feedback data and the action ignition condition on "give me your foot" are associated with each other, and registered in a predetermined table, and also the graphics data of the electronic pet under the state that it takes each action are registered. Further, for example, in the virtual electronic pet device 22, when the external input "give me your foot" is input, the graphics data of the electronic pet which takes each action are randomly selected and displayed. when the electronic pet taking the action "give me your foot" is displayed, the user gives the external input for praising it, and when the electronic pet under the other states is displayed, the user gives the external input to scold it. In the virtual electronic pet device 22, the learning is performed on the basis of the external input from the user as described above, the external input "give me your foot" and the graphics data of the state where the electronic pet takes the action "give me your foot" are associated with each other, and then the item on the trick "give me your foot" is added to the internal status, the feedback data and the action ignition condition.

In the learning processing of FIG. 12, when the electronic pet takes an action and there is an external input from the user, the action just before that is encouraged or suppressed. Besides, for example, it may be adopted that the history of the actions taken by the electronic pet is stored, and one or more of the plural actions taken previously is selected to encourage or suppress the action.

Next, the gene data stored in the spirit portion 1 corresponds to the gene of an active living thing. Accordingly, electronic pets serving as parents are crossed to give birth to (generate) an electronic pet serving as a child having the features of the parents.

Figure 17A:
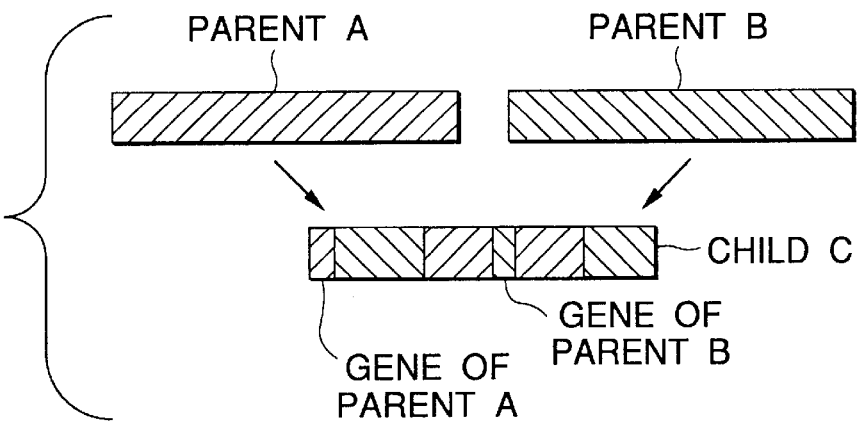
FIGS. 17A, 17B and 17C are diagrams showing a hybridization method.
Figure 17B:
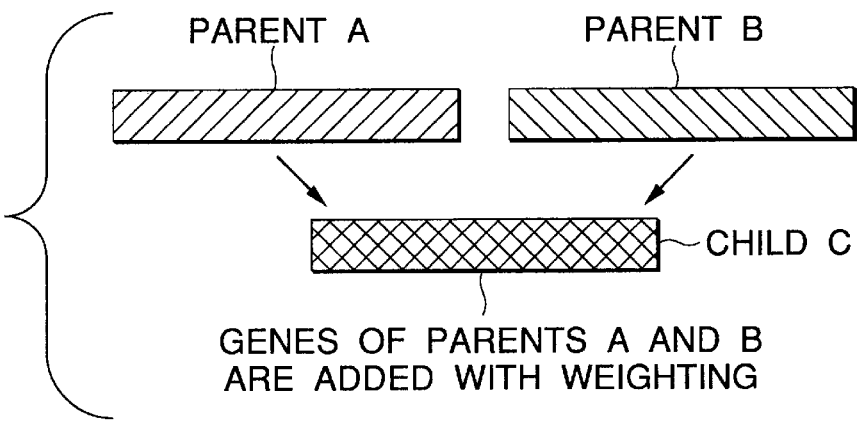
Figure 17C:
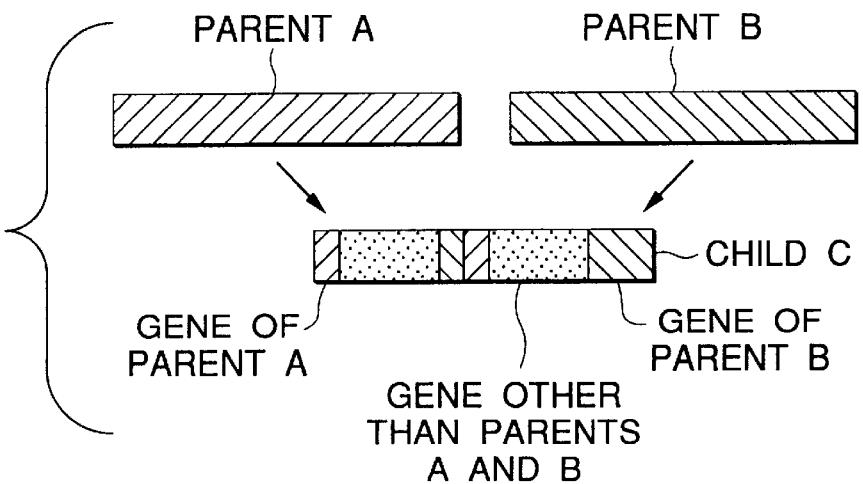

As shown in FIG. 17A, the hybridization can be performed by picking up a part of the gene data of an electronic pet serving as a parent (for example, father) A and a part of the gene data of an electronic pet serving as the other parent (for example, mother) B, and then setting these parts as the gene data of an electronic pet serving as a child C. Further, for example, as shown in FIG. 17B, the gene data of the electronic pet serving as the parent A and the gene data of the electronic pet serving as the parent B are subjected to weighting addition, and the addition result can be set as the gene data of the electronic pet serving as the child C. Further, for example, as shown in FIG. 17C, a part of the gene data of the electronic pet serving as the child C may be constructed by the gene data of the electronic pets serving as the parents A and B while the residual part is constructed by data which are irrelevant to the parents A and B. In this case, the electronic pet serving as the child C is a so-called mutation.

Figure 18:
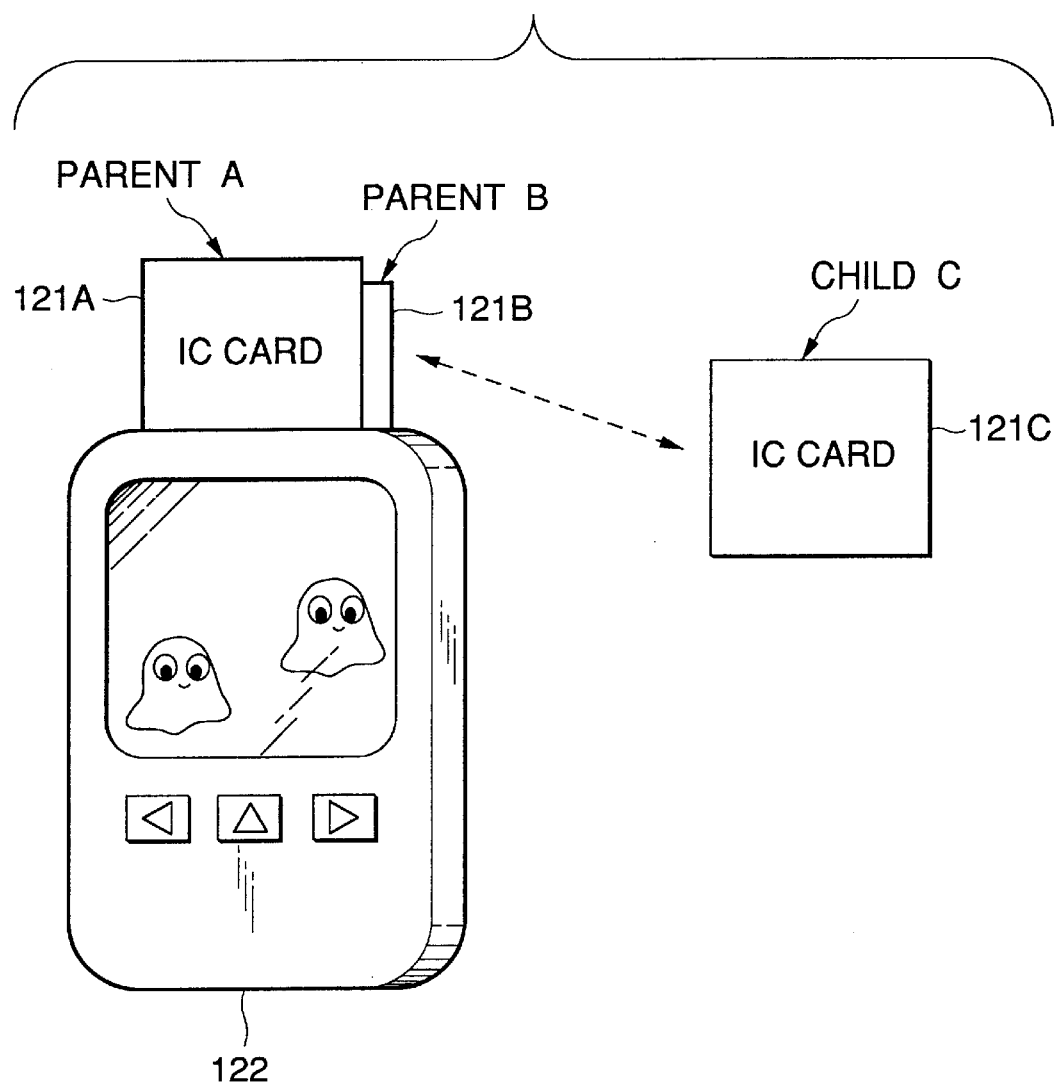
FIG. 18 is a diagram showing a method for performing hybridization.

The hybridization can be performed as shown in FIG. 18.

That is, the virtual pet device 122 is designed in the same construction as the virtual pet device 22 of FIG. 2. However, the virtual pet device 122 is provided with two slots which are similar to the slot 22A, and IC cards 121A and 121B for the parents A and B respectively are mounted in the slots. In this case, in the virtual pet device 122, the gene data of the child C can be formed from the gene data stored in the IC cards 121A and 121B as described with respect to FIG. 17. The gene data are stored in a memory which is contained in the IC card 121B of the parent B or the virtual pet device 122.

Thereafter, the IC card 121A serving as the parent A is taken out from the slot of the virtual pet device 122, and the IC card 121C serving as the spirit of the child C is mounted in the slot, whereby the gene data of the child C stored in the memory which is contained in the IC card 121B of the parent B or the virtual pet device 122 are transferred to the IC card 121C and stored.

Figure 19:
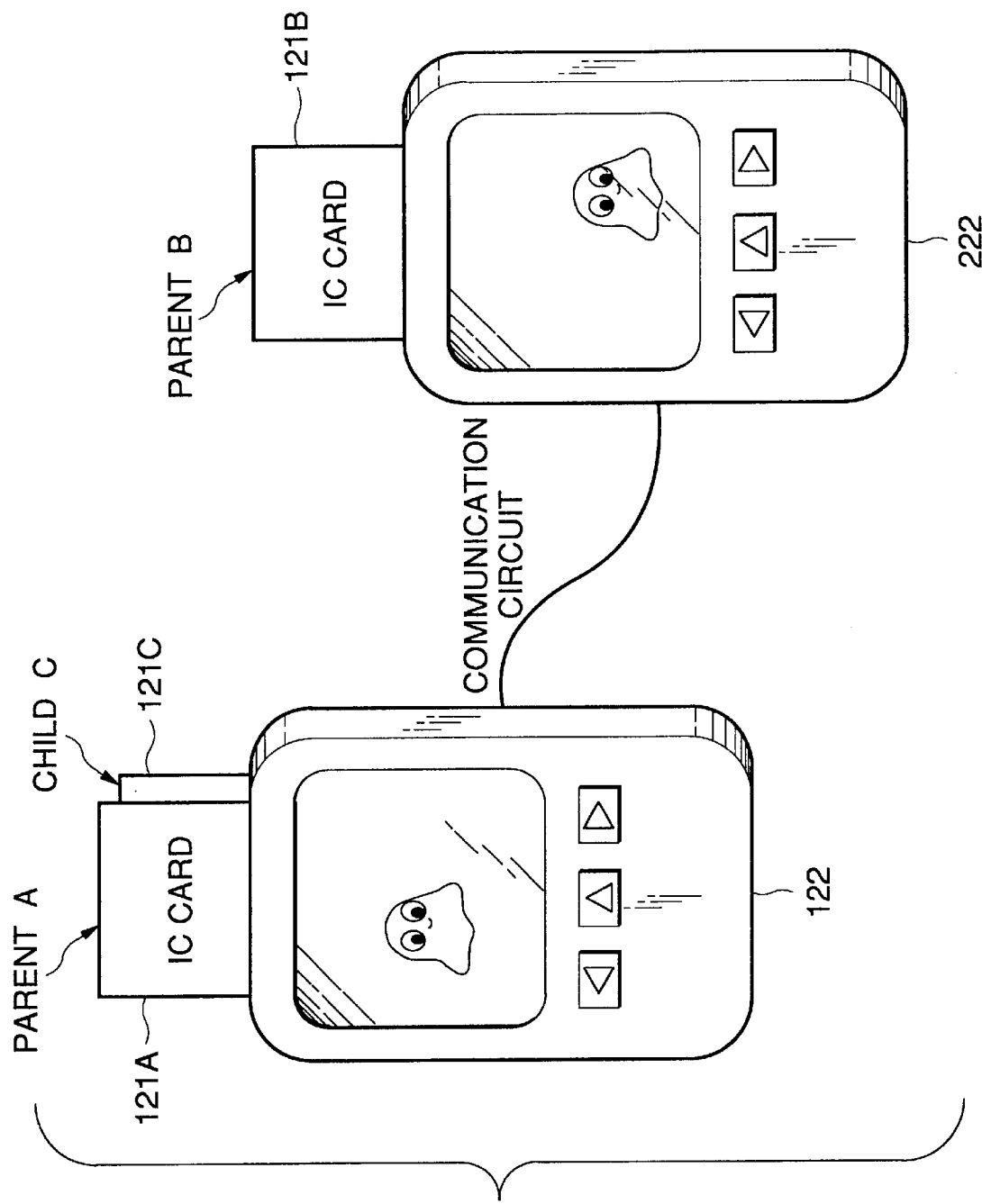
FIG. 19 is a diagram showing a method for performing hybridization.

Further, the hybridization may be performed as shown in FIG. 19, for example.

That is, in addition to the virtual pet device 122, a virtual pet device 222 (however, the number of the slots of the virtual pet device 222 may be equal to 1) which is designed in the same construction is prepared. For example, the IC card 121A of the parent A and the IC card 121C serving as the spirit of the child C are mounted in the virtual pet device 122, and the IC card 121B of the parent B is mounted in the virtual pet device 222. The virtual pet devices 122 and 222 are connected to each other through a prescribed communication line, and the gene data stored in the IC card 121B of the parent B are transferred from the virtual pet device 222 through the communication line 122 to the virtual pet device 122. In the virtual pet device 122, the gene data of the child C are formed from the gene data of the parent B which are transferred from the virtual pet device 122 and the gene data of the parent A stored in the IC card 121A as described with reference to FIG. 17, and stored in the IC card 121C of the child C.

A new electronic pet succeeding to the features of the parents can be born as described above.

The communication line of FIG. 19 may be of wire type or wireless type. Further, the communication line may be a cable of several meters, or a public line, internet, CATV (Cable Television) network or the like.

In the above case, the hybridization is performed by using the virtual pet device as the body portion 2, however, a pet type robot may be used as the body portion 2.

As described above, the parameter corresponding to the feeling of the electronic pet is contained in the internal status, and thus an irritable electronic pet, a crybaby electronic pet, etc. can be realized. The electronic pet can be made to take an action added with such a feeling, and further the feeling of the electronic pet can be changed by the action which is taken by itself.

Specifically, for example when the anger feeling of the electronic pet is highly strung because it is hungry, the electronic pet can be made to take a crying action or a sleeping action in order to suppress the excitation of the anger feeling of the electronic pet through the action.

As a result, the electronic pet having reality can be implemented.

Further, the internal status is stored in the IC card 21 which is detachably mounted in the virtual pet device 22 or the pet type robot 23, and thus the user can enjoy the electronic pet so as to match the user's circumstances.

In this embodiment, the IC card 21 is mounted in the virtual pet device 22 or the pet type robot 23 to make it function as an electronic pet. However, the IC card 21 may be mounted in a general computer or the like, whereby the computer can function as an electronic pet.

Further, in the above case, the renewal amounts $A_k(p,t)$ and $I_f(p,t)$ and the action ignition condition can be varied as the electronic pet grows up, that is, the time elapses. The other gene data such as the voice continuing time, the pitch, the accent, the color and the operation speed may be varied as the electronic pet grows up.

Still further, in this embodiment, the present invention is described by using an electronic pet as a target. The present invention may be applied to other living body objects other than the electronic pet (for example, plant objects, etc.).

Still further, in this embodiment, the gene data are stored in the IC card. However, as the storage medium for storing the gene data may be used other media such as a memory card, an optical card, an magnetooptical disc, a magnetic disc, etc. which are convenient to be carried and detachably mounted in a device.

Further, in this embodiment, the CPU 31 is made to execute the action control processing (FIG. 11) and the learning processing (FIG. 12). When the IC card 21 contains a processor therein, these processing may be performed by the processor.

Still further, in this embodiment, the spirit portion 1 for storing the gene data is detachably mounted in the body portion 2. However, a memory which is undetachably mounted in the body portion 2 may be provided to store the gene data in the memory.

In the virtual pet device 22, the electronic pet is a virtual being displayed on a monitor, and thus its appearance is easily changed. However, it is difficult for the pet type robot 23 to change its appearance by itself. Accordingly, in the pet type robot 23, gene data associated with the appearance is basically neglected. However, for example in the case where the pet type robot 23 is a dog type, if the tribe of the gene data is a bird, the pet type robot 23 may be made to request to change its part to bird's one (for example, make a request with a synthesized voice).

What is claimed is:

1. A storage medium detachably mounted in a body machine, the body machine serving as a body for a virtual living-body object, the storage medium comprising:
   an internal status parameter representing an internal status of the virtual living-body object including a feeling of the virtual living-body object;
   renewable data to be renewed in accordance with an action taken by the virtual living-body object, the action being based on the internal status parameter; and
   character/action tendency information for defining at least one of a character tendency and an action tendency of the virtual living-body object, wherein the virtual living-body object takes a further action based on both the character/action tendency information and the internal status parameter.

2. The storage medium as claimed in claim 1, wherein the character/action tendency information has renewal amount information on a renewal amount when the internal status parameter is renewed in accordance with the action of the virtual living-body object.

3. The storage medium as claimed in claim 1, wherein the character/action tendency information has condition information on a condition which the internal status parameter should satisfy when said virtual living-body object takes a prescribed action.

4. The storage medium as claimed in claim 3, wherein said virtual living-body object takes a prescribed action when the internal status parameter satisfies the condition information corresponding to the prescribed action.

5. The storage medium as claimed in claim 4, wherein the character/action tendency information has renewal amount information on a renewal amount when the internal status parameter is renewed in accordance with the action of said virtual living-body object, and when said virtual living-body object takes the action because the internal status parameter satisfies the condition information corresponding to the prescribed action, the internal status parameter is renewed on the basis of the renewal information corresponding to the action which is taken by said virtual living-body object.

6. The storage medium as claimed in claim 4, wherein when said internal status parameter satisfies the condition information corresponding to plural actions, said virtual living-body object selects one of the plural actions and takes the selected action.

7. The storage medium as claimed in claim 4, wherein when the internal status parameter satisfies the condition information corresponding to plural actions, if two or more of the plural actions can be taken at the same time, said virtual living-body object takes two or more of the actions at the same time.

8. The storage medium as claimed in claim 1, wherein the character/action information tendency information is renewed in accordance with an input from the external.

9. The storage medium as claimed in claim 8, wherein character/action tendency information has condition information on a condition which the internal status parameter should satisfy to make said virtual living-body object take a prescribed action, and information of the condition information which is associated with an action as a trick is renewed in accordance with an input from the external.

10. The storage medium as claimed in claim 8, wherein the character/action tendency information has condition information which the internal status parameter should satisfy to make said virtual living-body object take a prescribed action, and the condition information corresponding to a new action is added in accordance with an input from the external.

11. The storage medium as claimed in claim 1, wherein the character/action tendency information used to make said virtual living-body object take an action is renewed in accordance with a time lapse.

12. The storage medium as claimed in claim 11, wherein plural character/action tendency information pieces are stored, and an information piece used to make said virtual living-body object take an action is selected from the plural character/action tendency information pieces in accordance with the time lapse.

13. The storage medium as claimed in claim 11, wherein plural character/action tendency information pieces are stored, and an interpolation is performed on the basis of the plural character/action tendency information to generate character/action tendency information used at each time.

14. The storage medium as claimed in claim 1, wherein said storage medium comprises an IC (integrated circuit) card or a magnetic disk.

15. A robot functioning as a body of a virtual living-body object, the robot comprising a detachably mounted storage medium which stores renewable data and character/action tendency information, the renewable data being renewed in accordance with an action taken by the virtual living-body object based on an internal status parameter, the internal status parameter representing an internal status of the virtual living-body object including a feeling of the virtual living-body object, and the character/action tendency information defining at least one of a character tendency and an action tendency of the virtual living-body object, wherein the virtual living-body object takes a further action based on both the character/action tendency information and the internal status parameter.

16. The robot as claimed in claim 15, wherein the character/action tendency information has renewal amount information on a renewal amount when the internal status parameter is renewed in accordance with the action of said virtual living-body object.

17. The robot as claimed in claim 15, wherein the character/action tendency information has condition information on a condition which the internal status parameter should satisfy to make said virtual living-body object take a prescribed action.

18. The robot as claimed in claim 17, wherein said virtual living-body object takes a prescribed action when the internal status parameter satisfies the condition information corresponding to the prescribed action.

19. The robot as claimed in claim 18, wherein the character/action tendency information has renewal amount information on a renewal amount when the internal status parameter is renewed in accordance with the action of said virtual living-body action, and the internal status parameter satisfies the condition information corresponding to a prescribed action and thus said virtual living-body object takes the action, the internal status parameter is renewed on the basis of the renewal amount information corresponding to the action which said virtual living-body object takes.

20. The robot as claimed in claim 18, wherein when the internal status parameter satisfies the condition information corresponding to plural actions, said virtual living-body object selects one of the plural actions and takes the selected action.

21. The robot as claimed in claim 18, wherein when the internal status parameter satisfies the condition information corresponding to the plural actions, if two or more of the plural actions can be simultaneously performed, said virtual living-body object takes the two or more actions at the same time.

22. The robot as claimed in claim 15, wherein the character/action tendency information is renewed in accordance with an input from the external.

23. The robot as claimed in claim 22, wherein the character/action tendency information has condition information on a condition which the internal status parameter satisfies to make the virtual living-body object take a prescribed action, and information on actions as tricks in the condition information is renewed in accordance with an input from the external.

24. The robot as claimed in claim 22, wherein the character/action tendency information has condition information on a condition which the internal status parameter should satisfy to make the virtual living-body take a prescribed action, and the condition information corresponding to a new action is added in accordance with an input from the external.

25. The robot as claimed in claim 15, wherein the character/action tendency information used to make the virtual living-body object take an action is renewed in accordance with a time lapse.

26. The robot as claimed in claim 25, wherein said storage medium stores plural character/action tendency information, and information to make said virtual living-body object take an action is selected from the plural character/action tendency information in accordance with the time lapse.

27. The robot as claimed in claim 25, wherein said storage medium stores plural character/action tendency information, and character/action tendency information used at each time is generated by performing interpolation on the basis of the plural character/action tendency information.

28. The robot as claimed in claim 15, wherein said storage medium comprises an IC (integrated circuit) card or a magnetic disk.

29. An information processing device which functions as a body of a virtual living-body object and which performs processing to display the virtual living-body object, the information processing device comprising a detachably mounted a storage medium which stores renewable data and character/action tendency information, the renewable data being renewed in accordance with an action taken by the virtual living-body object based on an internal status parameter, the internal status parameter representing an internal status of the virtual living-body object including a feeling of the virtual living-body object, and the character/action tendency information defining at least one of a character tendency and an action tendency of the virtual living-body object, wherein the virtual living-body object takes a further action based on both the character/action tendency information and the internal status parameter.

30. The information processing device as claimed in claim 29, wherein the character/action tendency information has renewal amount information on a renewal amount when the internal status parameter is renewed in accordance with the action of said virtual living-body object.

31. The information processing device as claimed in claim 29, wherein the character/action tendency information has condition information on a condition which the internal status parameter should satisfy to make said virtual living-body object take a prescribed action.

32. The information processing device as claimed in claim 31, wherein said virtual living-body object takes a prescribed action when the internal status parameter satisfies the condition information corresponding to the prescribed action.

33. The information processing device as claimed in claim 32, wherein the character/action tendency information has renewal amount information on a renewal amount when the internal status parameter is renewed in accordance with the action of said virtual living-body action, and the internal status parameter satisfies the condition information corresponding to a prescribed action and thus said virtual living-body object takes the action, the internal status parameter is renewed on the basis of the renewal amount information corresponding to the action which said virtual living-body object takes.

34. The information processing device as claimed in claim 32, wherein when the internal status parameter satisfies the condition information corresponding to plural actions, said virtual living-body object selects one of the plural actions and takes the selected action.

35. The information processing device as claimed in claim 32, wherein when the internal status parameter satisfies the condition information corresponding to the plural actions, if two or more of the plural actions can be simultaneously performed, said virtual living-body object takes the two or more actions at the same time.

36. The information processing device as claimed in claim 29, wherein the character/action tendency information is renewed in accordance with an input from the external.

37. The information processing device as claimed in claim 36, wherein the character/action tendency information has condition information on a condition which the internal status parameter satisfies to make the virtual living-body object take a prescribed action, and information on actions as tricks in the condition information is renewed in accordance with an input from the external.

38. The information processing device as claimed in claim 36, wherein the character/action tendency information has condition information on a condition which the internal status parameter should satisfy to make the virtual living-body take a prescribed action, and the condition information corresponding to a new action is added in accordance with an input from the external.

39. The information processing device as claimed in claim 29, wherein the character/action tendency information used to make the virtual living-body object take an action is renewed in accordance with a time lapse.

40. The information processing device as claimed in claim 39, wherein said storage medium stores plural character/action tendency information, and information to make said virtual living-body object take an action is selected from the plural character/action tendency information in accordance with the time lapse.

41. The information processing device as claimed in claim 39, wherein said storage medium stores plural character/action tendency information, and character/action tendency information used at each time is generated by performing interpolation on the basis of the plural character/action tendency information.

42. The information processing device as claimed in claim 29, wherein said storage medium comprises an IC (integrated circuit) card or a magnetic disk.

43. An electronic pet system, comprising:
  a storage medium for storing renewable data to be renewed in accordance with an action taken by an electronic pet, the action being based on an internal status parameter which represents an internal status of the electronic pet including a feeling of the electronic pet, the storage medium capable of being detachably mounted in a device functioning as a body of the electronic pet;
  a robot which functions as a first body of the electronic pet, and in which the storage medium may be detachably mounted; and
  an information processing device which functions as a second body of the electronic pet by performing processing to display the electronic pet and in which the storage medium may be detachably mounted;
  wherein the storage medium further stores character/action tendency information for defining at least one of a character tendency and an action tendency of the electronic pet and the electronic pet takes a further action based on both the character/action tendency information and the internal status parameter.

44. The electronic pet system as claimed in claim 43, wherein the character/action tendency information has renewal amount information on a renewal amount in accordance with the action of the electronic pet.

45. The electronic pet system as claimed in claim 43, wherein said character/action tendency information has condition information on a condition which the internal status parameter satisfies to make the electronic pet take an action.

46. The electronic pet system as claimed in claim 45, wherein the electronic pet takes a prescribed action when the internal status parameter satisfies the condition information corresponding to the prescribed action.

47. The electronic pet system as claimed in claim 46, wherein the character/action tendency information has renewal amount information on a renewal amount when the internal status parameter is renewed in accordance with the action of the electronic pet, and when the internal status parameter satisfies the condition information corresponding to a prescribed action and thus the electronic pet takes the action, the internal status parameter is renewed on the basis of the renewal amount information corresponding to the action which the electronic pet takes.

48. The electronic pet system as claimed in claim 46, wherein when the internal status parameter satisfies the condition information corresponding to plural actions, the electronic pet selects one of the plural actions, and takes the selected action.

49. The electronic pet system as claimed in claim 46, wherein when the internal status parameter satisfies the condition information corresponding to plural actions, if two or more of the plural actions can be simultaneously performed, the electronic pet takes the two or more actions at the same time.

50. The electronic pet system as claimed in claim 43, wherein the character/action tendency information is renewed in accordance with an input from the external.

51. The electronic pet system as claim in claim 50, wherein the character/action tendency information has condition information on a condition which the internal status parameter should satisfy to make the electronic pet take a prescribed action, and information on actions as tricks in the condition information is renewed in accordance with an input from the external.

52. The electronic pet system as claimed in claim 50, wherein the character/action tendency information has condition information on a condition which the internal status parameter should satisfy to make the electronic pet take a prescribed action.

53. The electronic pet system as claimed in claim 43, wherein the character/action tendency information used to make the electronic pet take an action is renewed in accordance with a time lapse.

54. The electronic pet system as claimed in claim 53, wherein said storage medium stores plural character/action tendency information pieces, and an information piece used to make the electronic pet take an action is selected from the plural character/action tendency information pieces in accordance with the time lapse.

55. The electronic pet system as claimed in claim 53, wherein said storage medium stores plural character/action tendency information, and character/action tendency information at each time is generated by performing interpolation on the plural character/action tendency information.

56. The electronic pet system as claimed in claim 43, wherein said storage medium comprises an IC (integrated circuit) card or a magnetic disk.

* * * * *